United States Patent [19]

Moore et al.

[11] 3,801,962

[45] Apr. 2, 1974

[54] COMMUNICATION MECHANISM FOR DATA TRANSFER AND CONTROL BETWEEN DATA PROCESSING SYSTEMS AND SUBSYSTEMS

[75] Inventors: Brian B. Moore, Syracuse; Caryl A. Thorn, Poughkeepsie, both of N.Y.

[73] Assignee: International Business Machines Corporation, Armonk, N.Y.

[22] Filed: Dec. 29, 1972

[21] Appl. No.: 319,958

[52] U.S. Cl. .......... 340/172.5
[51] Int. Cl. .......... G06f 3/00
[58] Field of Search .......... 340/172.5

[56] References Cited

UNITED STATES PATENTS

| | | | |
|---|---|---|---|
| 3,673,576 | 6/1972 | Donaldson, Jr. | 340/172.5 |
| 3,714,635 | 1/1973 | Hamilton et al. | 340/172.5 |

*Primary Examiner*—Raulfe B. Zache
*Attorney, Agent, or Firm*—Owen L. Lamb

[57] ABSTRACT

Apparatus for establishing and maintaining communication between a number of different types of subsystems of a data processing system. The apparatus contains elements which are subsettable with respect to the various functions which are performed depending upon the characteristics of each of the subsystems which are connected together.

One function is that of attaching process control devices to a central processing unit. These devices are characterized by having simple interfaces, by involving non-terminating operations, by having high storage access rates and by time dependencies.

A further function is that of inter-CPU signalling involving the transfer of small amounts of information.

A further function is that of sharing main storage between a CPU and a subsystem element.

The communication apparatus is comprised of two separate and functionally independent logical elements. The first is an external main storage adapter which performs the function of sharing storage between the central processing unit and a subsystem element. The second logical unit is the control adapter which provides the physical and logical connection between the subsystem units. The control adapter attaches to a control interface which contains a polling mechanism, a selection mechanism, a general bus, and several interlocked communication tag lines. A control transfer sequence is defined by the interface such that each attached subsystem may initiate communication with any other attached subsystem. A polling mechanism allocates temporary control of the interface to a unit desiring to initiate communication. A selection mechanism allows selective subsystem-to-subsystem communication.

4 Claims, 35 Drawing Figures

POLLING

FIG. 11 INTERFACE ADAPTER LOGIC (ATTACHED UNIT, UNIT 1)
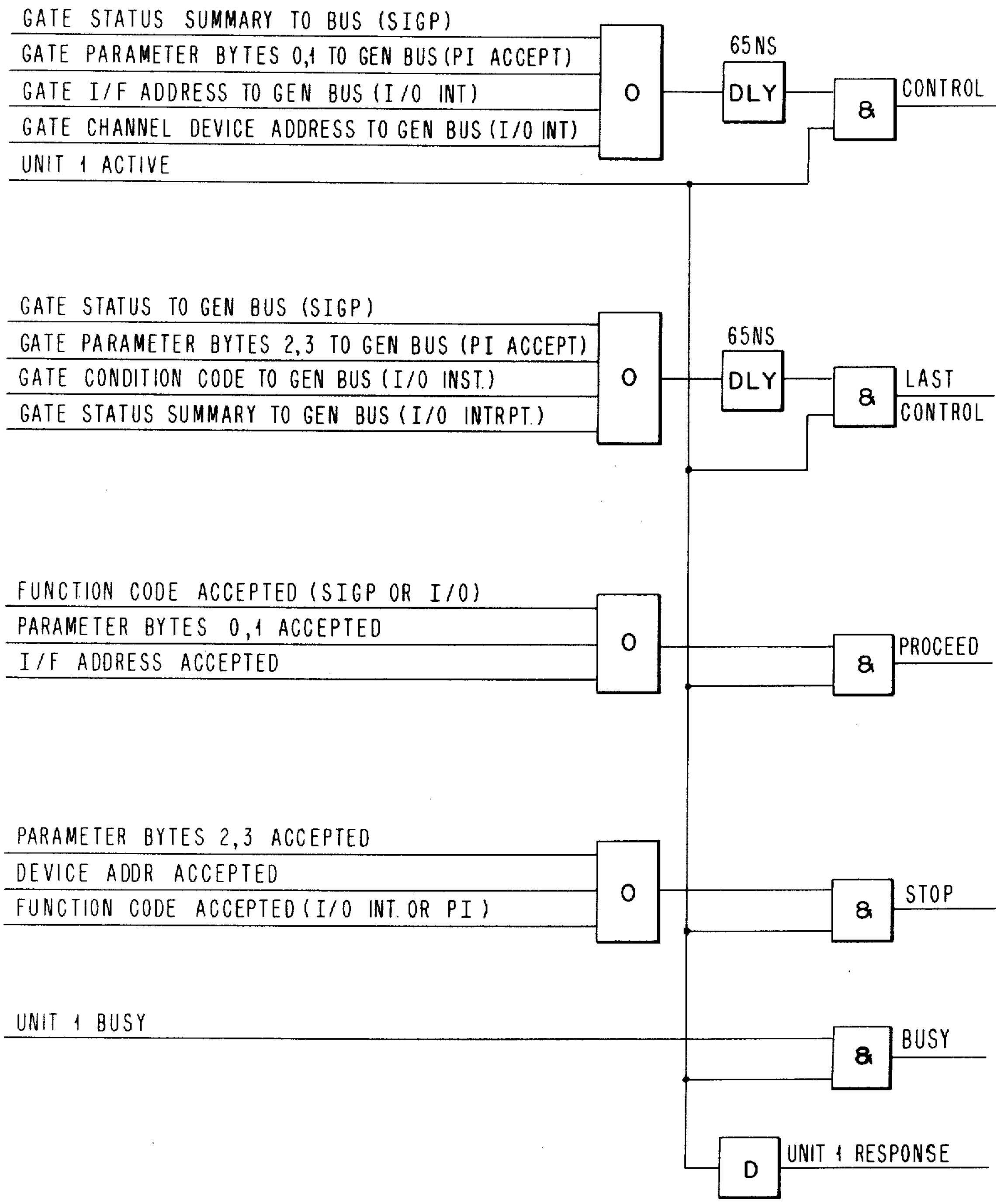

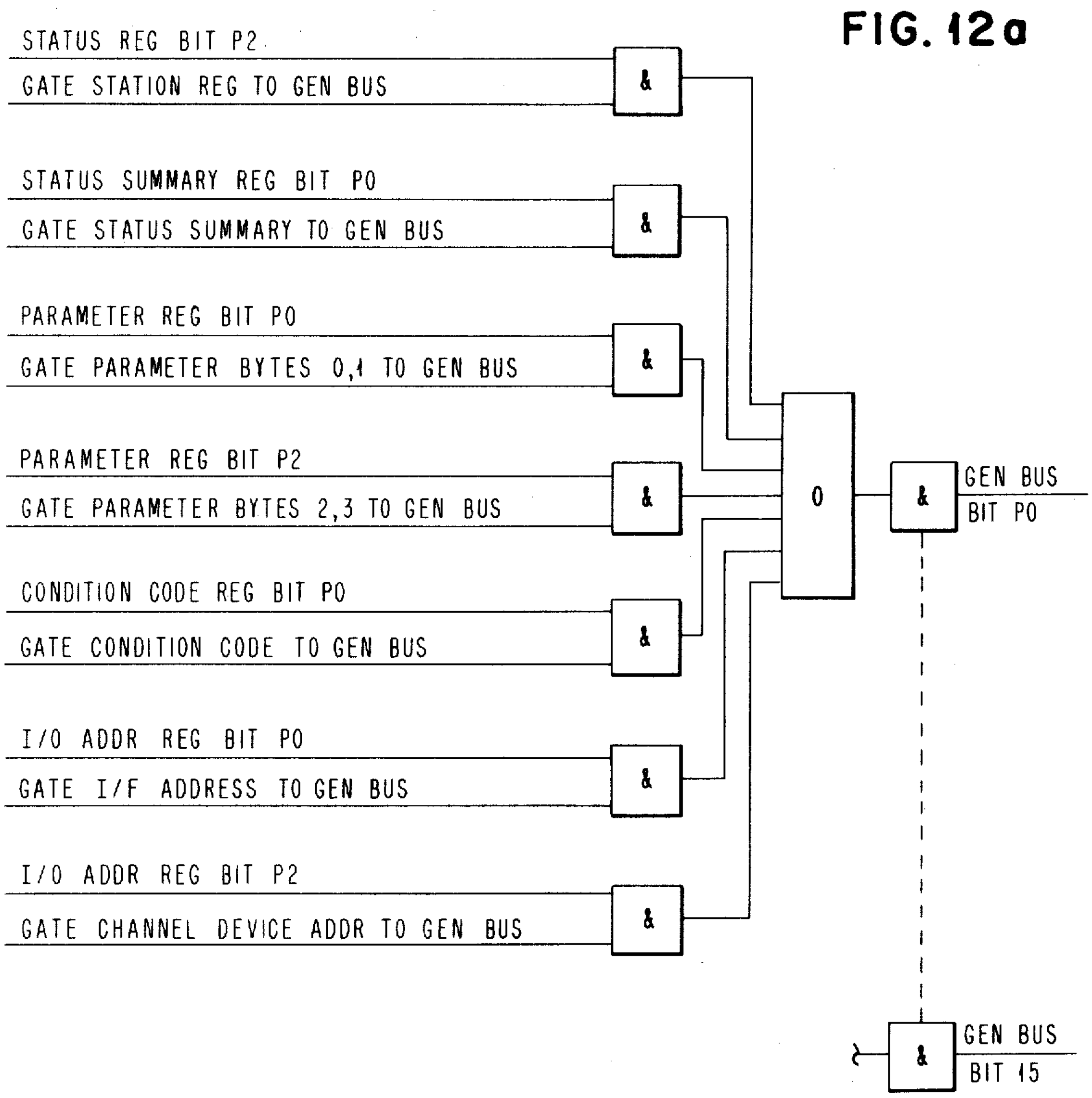
FIG. 12b
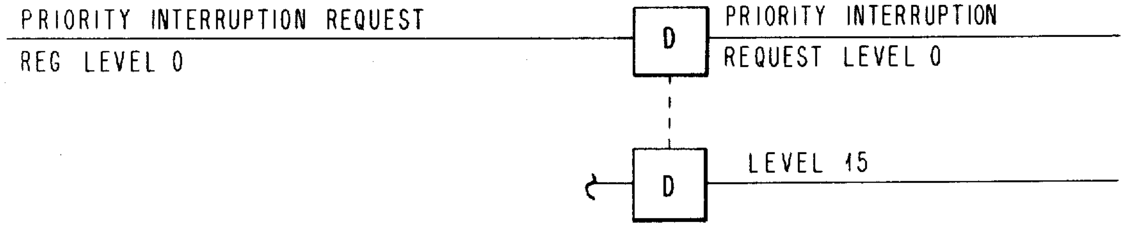

MAIN STORAGE ADAPTER

POLLING (CONTINUED)

PRIORITY INTERRUPTION

DATA TRANSFER SEQUENCE

POLLING SEQUENCE

CONTROL-TRANSFER SEQUENCE (SIGNAL PROCESSOR)
(UNIT 0 IS COMMUNICATING WITH UNIT 1)

CONTROL-TRANSFER SEQUENCE (PRIORITY INTERRUPTION ACCEPTANCE)

CONTROL-TRANSFER SEQUENCE (I/O INSTRUCTION)

CONTROL-TRANSFER SEQUENCE (I/O INTERRUPTION ACCEPTANCE)

RESET SEQUENCE

COMMUNICATION MECHANISM FOR DATA TRANSFER AND CONTROL BETWEEN DATA PROCESSING SYSTEMS AND SUBSYSTEMS

CROSS REFERENCE TO RELATED APPLICATIONS

U.S. Pat. application Ser. No. 268,959 filed July 5, 1972 entitled "Operation Request Block Usage", by Brian B. Moore.

U.S. Pat. application Ser. No. 268,268 filed July 3, 1972 entitled "Signal Processor Instruction for Non-Blocking Communication Between Data Processing Units", by B. B. Moore, A. Padegs and R. M. Smith.

FIELD OF THE INVENTION

The invention relates to data processing systems and more particularly to apparatus for communication between subsystem elements.

In information systems, information is derived from many sources (such as terminals) other than the central processing element. The rapid increase in information systems has given rise to a number of incomplete and incompatible subsystems. One important requirement is that information systems have the modularity which allows subsystems to be added or subtracted. A further need is compatibility which allows a subsystem to be used in other data processing systems.

Information systems generally operate with terminals in a real time environment. This raises the need for a fast response to inquiry at the terminal.

There are many information systems in use throughout the data processing industry. Systems that have been designed by different manufacturers lack compatibility. Furthermore, these systems have been designed to a particular application, such as a sensor base or processor control application or a multiprocessing application. No systems exist in which all subsystem requirements for communication are satisfied by one communication mechanism.

As a first example, consider sensor based systems. A sensor base application is a real time application which involves control of an external process which occurs at the same time as system computing activity. The external processors are monitored by real time equipment such as electrical meters, switches, gauges and telemetry equipment. This equipment is connected to real time input devices such as analog to digital converters, digital input registers, and interruption signals. Generally, the input is available or valid for only a short period of time. Given an external stimulus, there is generally a corresponding maximum allowable time lapse until a response must be made. This means that the system must accept, analyze, and react to the input data in real time. The systems reaction modifies the process by means of real time output devices such as digital to analog converters, digital output registers, and pulse output generators. The output device is connected to real time process control equipment such as electrical meters, motors, switches, clocks, and signalling equipment.

A large amount of monitoring and controlling equipment is necessary. Thus, the number of real time devices controlled by the system is also large. Each piece of equipment and each device has unique electrical and logical characteristics.

The subsystem element that stands between the devices and the CPU is called a real time channel. The channel standardizes communication between the CPU and the devices and it also provides the system with the ability of running many devices simultaneously in a time division multiplex fashion.

The systems requirements for a sensor base application can be summarized as follows: the system must control many devices concurrently; it must control many types of devices; it must allow non-terminating operations; it must provide real time inputs to the system; it must provide a real time response to external stimuli; and it must provide for real time data collection.

Another type of subsystem configuration is multiprocessing wherein several CPUs or subsystems share a common main storage. In a tightly coupled multiprocessing system, each subsystem must have the capability of controlling each other subsystem. Thus, no permanent "master-slave relationship" should be permitted to exist. Furthermore, if one CPU or subsystem becomes inoperative, the input/output channels attached to that system must be made available to the rest of the data processing system.

In summary, the systems requirements of the tightly coupled multiprocessing application are: it must allow communication between many CPUs; it must allow sharing of input/output channels; and it must provide high availability.

SUMMARY OF THE INVENTION

It is a primary object of this invention to provide a communication mechanism for a data processing system which is general enough to accommodate all subsystems attachable thereto.

It is a further object of this invention to provide a communication mechanism between subsystems which provides a standardized definition to prevent unmanageable proliferation and confusion in large information systems.

A further object of this invention is to provide a communication mechanism between subsystems in a multiprocessing environment.

A further object is to provide a communication mechanism with the ability to share I/O units and subsystems between multiprocessing CPUs.

A further object of the invention is to provide a communication mechanism which will operate in a paged environment to accommodate program relocation.

A further object of the invention is to provide a mechanism which permits the attachment of process control devices to a data processing system to obtain high data rates and permit real time responses.

A further object is to provide a communication mechanism between sensor base subsystems and a central processing unit.

A further object of the invention is to provide a communication mechanism which allows the attachment of intelligent I/O subsystems to a data processing system.

A further object of the invention is to provide a communication mechanism for attaching integrated channel-control units to a central processing unit such that a single channel control unit design is capable of being attached to small and intermediate as well as large data processing systems.

A further object of the invention is to provide a communication mechanism between a sophisticated input/output channel (e.g., in which certain I/O supervisor functions are performed) and a central processing unit.

A further object of the invention is to provide a system wherein two or more CPUs share a common storage and communicate asynchronously.

A further object of the invention is to provide a communication mechanism between subsystem elements in which a permanent master-slave relationship may selectively exist or not exist depending upon the requirements of the subsystem.

A further object of the invention is to provide a communication mechanism between a central processing unit and a subsystem which requires real time data rates and real time responses to external stimuli while still being able to accommodate subsystems which do not require such responses.

A further object of the invention is to provide a communication mechanism which has the capability of performing a number of separable functions only some of which may be utilized in attaching a subsystem.

A further object of the invention is to provide a communication mechanism which has the inherent capability of being extended as new requirements for subsystem attachment become apparent.

Briefly, the above objects are accomplished in accordance with the invention by providing a communication mechanism between computer subsystems and a central processing unit of said computer in which separate and logically independent transfer paths are provided. One path is provided for control transfers and the other path is provided for data transfers.

The control transfer path allows communication between all subsystems. Subsystems are connected in a multi-dropped manner. The communication apparatus includes a polling mechanism, a selection mechanism, a general bus and several interlocked tag lines. This provides for DC interlocked control-transfer sequences between subsystems, allows subsystems to request priority interruptions and provides an acceptance sequence in response to the interruptions.

Communication between the main storage of the CPU and the subsystems is accomplished over a second and independent data transfer path. This path provides a point-to-point connection which allows a single subsystem to request data transfers. This path has a storage address bus, a key bus, a mask bus, a bi-directional data bus, a check bus, and several interlocked tag lines. This provides for DC interlocked data transfers on a pipelined or non-pipelined basis.

The invention has the advantage that, with separate and logically independent control and data paths, the functions are made independent and are easily adaptable to different types of subsystems.

For example, the control path performs those control functions between the instruction executer and the subsystem. Data transfers are handled independently over the data transfer path which provides an interface between each subsystem and main storage.

The invention has the advantage that is it easily adaptable to multiprocessing applications with shared I/O channels.

The invention has the further advantage that the communication mechanism between the CPU and the external unit is symmetrical and therefore, there is no necessity for a permanent master-slave relationship.

The invention has the further advantage that it provides a single defined communication mechanism for memory accessing, high-speed data transfer, unit selection, priority interrupt, and a simple means for interruption initiation.

The invention has the further advantage that functions are fully subsettable to provide only part or a full set of systems functions.

The invention has the further advantage that it provides a standard method of sharing storage between a CPU and a subsystem component.

DESCRIPTION OF THE DRAWINGS

FIG. 11 is a block diagram of the interface adapter control lines for a subsytem;

FIG. 12A is the logic required to generate the general bus bits 0 – 15;

FIG. 12B is logic for the drivers for priority interruption bus;

INTRODUCTORY DESCRIPTION

Figures 1, 3:
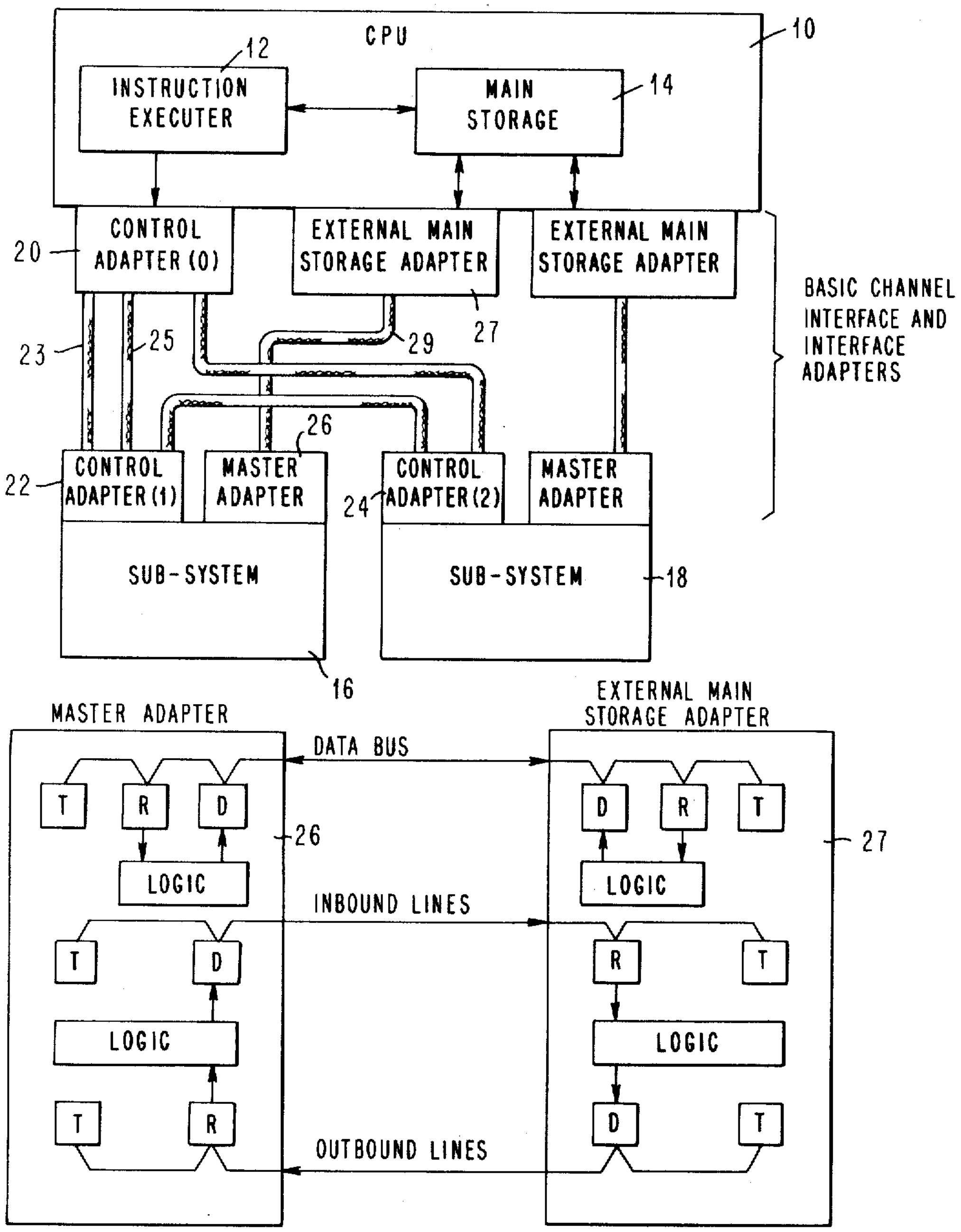
FIG. 1 is an overall block diagram of a computer system in which the invention (Basic Channel Adapter) is embodied.
FIG. 3 is a block schematic diagram of the master adapter and the external storage adapter shown in FIG. 1.

Referring to FIG. 1, an overall block diagram of a data processing system embodying the invention is shown. A central processing unit 10 includes an instruction execution unit 12 and a main storage 14. The instruction executor communicates with subsystems 16 and 18 by means of a control adapter 20. There are two paths connecting the control adapter 20 with the control adapters 22 and 24 associated with the subsystems. The first path 23 is for point-to-point interruption or interruption requests and the second path 25 is a multidrop path which threads between the control adapters. This is attached to an interface for initiating instructions such as signal processor or start I/O or halt I/O and for accepting interruptions; that is, priority interruptions, I/O interruptions, etc. The signal processor instruction is more fully described in the above identified U.S. Pat. application Ser. No. 268,268.

A subsystem 16 responds to a signal processor instruction which directs the subsystem to read input data. The subsystem accepts the parameter address from the CPU by means of the control adapter 20. The CPU is then released and continues with instruction processing. As the data is read by the subsystem, the data is transferred to main storage 14 by means of the master adapter 26 connecting to external main storage adapter 27. After all the data has been transferred, the subsystem requests a priority interruption of the CPU to tell the program running in the CPU that the data has been transferred. This communication is accomplished over the priority interruption interface point to point. When the CPU is in the correct condition to accept an interruption, it signals by means of the control adapter that this interruption is being accepted. The subsystem then sends status over the control adapter interface and the CPU processes the interruption.

If the subsystem is a data channel, then an instruction called Start I/O is executed by the data channel and I/O interruptions are processed. This additional function is accomplished by additional logic.

Thus, there are two separate functions accomplished by the basic channel adapter: the signal processor instruction and its interruptions and the distinct start I/O instruction and its interruptions. Thus, the basic channel adapter is subsettable in that a given subsystem can utilize either one or both without having to resolve contention between the two instructions.

External Main Storage Adapter

The external main storage adapter provides a standard method of sharing the main storage 14 of FIG. 1 with the subsystems 16 and 18. Each external main storage adapter allows a single attached subsystem to store information in and extract information from the main storage 14. The external main storage adapter is connected to the master adapter 26 by means of the external main storage interface 29. The interface is described in detail in External Main Storage Interface and includes a data bus, a storage address bus, a storage protection key bus, a mark bus, a check bus, and several tag lines for controlling data transfer sequences used to transfer information to or from main storage.

Master Adapter

Each subsystem 16 connected to the external main storage interface by means of a master adapter 26. The master adapter provides the main storage address and the storage protection key associated with a main storage request. If the requested data transfer involves a movement of information into main storage, the master adapter provides the data and mark information for the selective storage of data bytes. The master adapter also preserves any malfunction, storage protection violation, or invalid storage address indications for later presentation as status to the central processing unit.

Control Adapter

The control adapter 20 in FIG. 1 performs three independent systems functions which can exist in a given system configuration with or without the others.

The first function is that of attaching subsystem elements which can execute requests from the CPU which are more complex than those associated with ordinary input/output operations.

The second function is that of inter-CPU signalling in multiprocessor configurations.

The third function is that of attaching data channels to the CPU.

Each control adapter allows communication between several attached units. The units may be subsystem elements, other control adapters, channels, channel-control units, or a mixture of these.

An example of such a subsystem is a process controlled subsystem, the operation of which is started by the execution of a SIGNAL PROCESSOR instruction more fully described in the above identified Moore et al. patent application. Another type of subsystem is an input/output data channel, the operation of which is initiated by means of a START I/O instruction more fully described in IBM System/360 Principles of Operation, IBM System Reference Library, Form No. 822-6821-5, which may be obtained by contacting any IBM Branch Office.

Control adapters are connected together by means of the control interface more fully described in Control Interface. It is a fully checked DC interlock interface which is symmetrical in its design. No permanent master-slave relationship between two control adapters need exist. Both are capable of either role, with the other then assuming the complimentary role.

All units attached to this interface are potentially equal by the polling technique which is logically circular and not supervised or controlled by any one unit.

DETAILED DESCRIPTION

Figure 2:
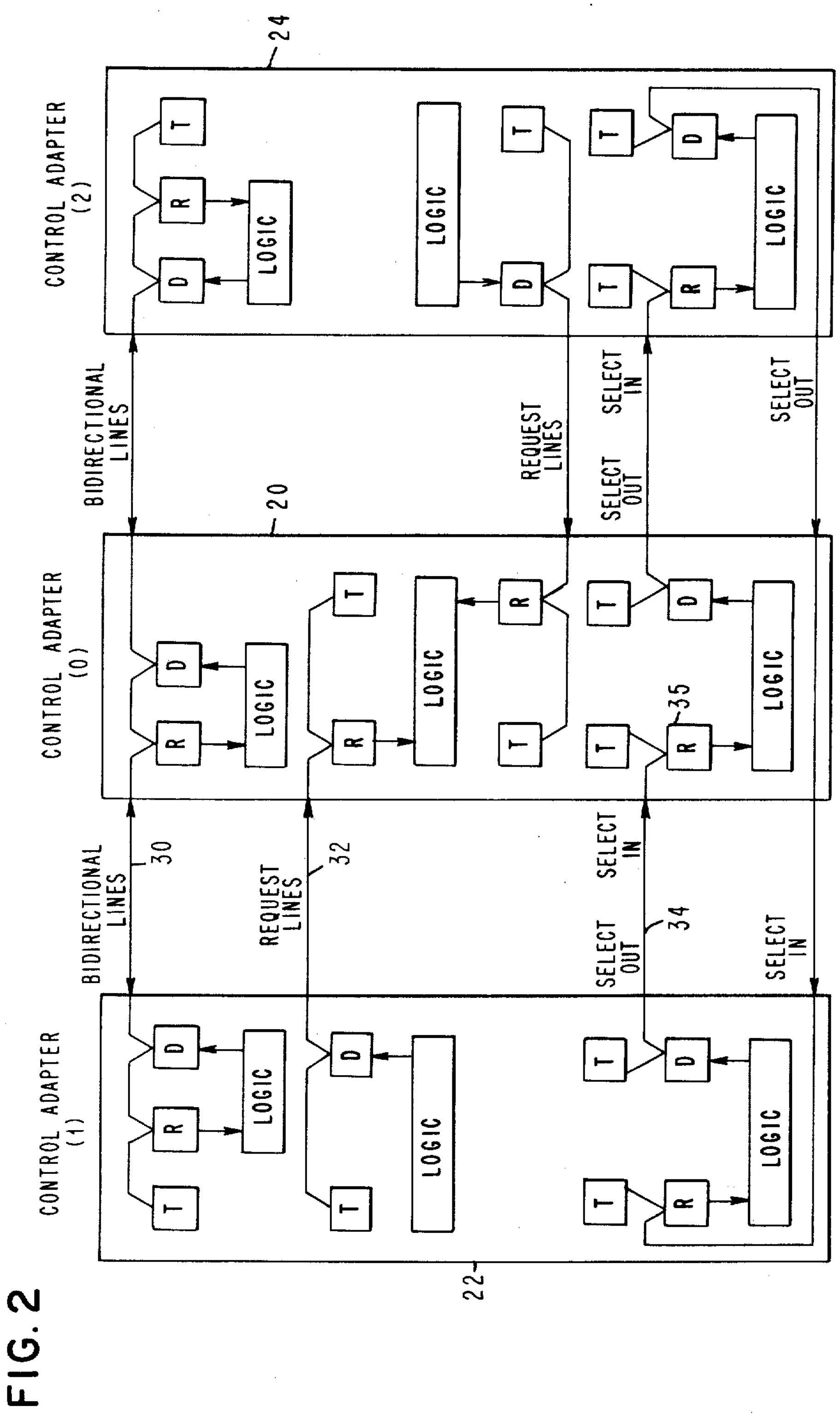
FIG. 2 is a schematic drawing showing interconnections of the control adapters 0, 1 and 2 of FIG. 1.

FIG. 2 illustrates the connection of lines between the control adapters illustrated in FIG. 1. Bi-directional lines 30 are utilized to send information from one unit to the other or to receive information back on the same wire. For example, on one of the bi-directional lines, the signal processor instruction is executed. Control adapter 0 which is in the CPU sends out the function code or the parameter address on one of the bi-directional lines from control adapter 0 to control adapter 1. Thus, the driver in control adapter 0 is on. The receiver in control adapter 1 will be energized to receive. After signal processor has been transferred, the subsystem sends back the status indicating that it was received or that there was an error. The status indications are sent back on the same line from the subsystem, control adapter 1 to the CPU control adapter 0. Thus, the bi-directional lines are a demand/response type of line.

The second type of lines 32 are request lines. Thus, the priority interruption request lines or the I/O interruption request lines are uni-directional. There are 16 priority interruption request lines. When the subsystem drives one of these lines, a signal arriving on that line at the control adapter means that the subsystem is requesting an interruption on a certain level. There is one of these request lines for each priority interruption level. So if the subsystem raises line 7, that means that it is requesting an interruption of the CPU at priority interrupt level 7.

The select lines 34 are polling lines. These lines thread through each control adapter. Assuming that unit 1 has the poll and unit 0 requests the poll (or if unit 1 decides to pass the poll), then unit 1 raises its select out line. The select out signal propagates across the wire in the interface to unit 0 which receives it through the receiver 35. If unit 0 wants the poll, it does not allow this signal to pass through the unit. Control adapter 0 terminates the signal at its receiver and uses the logic to raise another line called deselect (not shown in FIG. 2) which signals to the unit 1 that unit 0 is taking the poll. The polling sequence is at this point completed.

If unit 1 had the poll and unit 2 requests the poll (by raising "polling request"), then unit 1 raises select out. The signal propagates across the interface wire to unit 0 which would receive select in. Since unit 0 does not want the poll, it raises select out and that select out signal propagates across the interface to unit 2 which receives the signal. Since unit 2 wants the poll, it raises deselect and the sequence is completed.

FIG. 3 is an electrical diagram of the interconnection between the master adapter and the external main storage adapter. The data bus is bi-directional whereas the inbound and outbound lines are uni-directional. Information destined to main storage flows toward the external main storage adapter and information destined to be written into the subsystem flows toward the master adapter.

External Main Storage Interface

Figure 5:
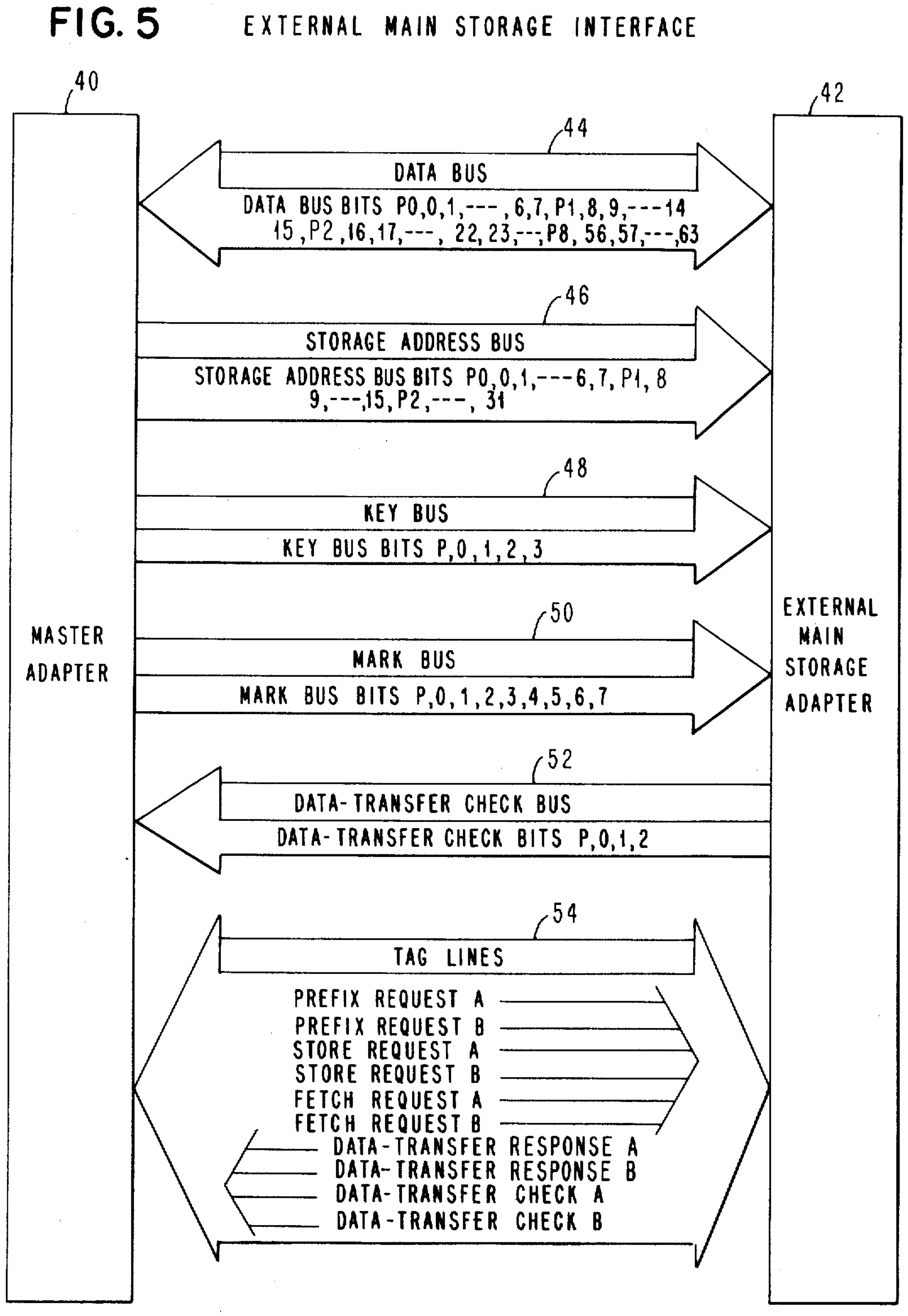
FIG. 5 is a detailed drawing showing all of the interconnecting lines between the master adapter and the external main storage adapter.

Referring to FIG. 5, the external main storage interface allows a single master adapter 40 to transfer information to or from the main storage 14 of FIG. 1. In general, each main storage requires an adapter to convert the signals and formats of the external main storage interface to and from the signals and formats required by its own native interface.

The external main storage interface provides the connection between the adapter and the master unit. It is composed of a modular collection of electrical lines and interface sequences which permit the master unit to transfer information to or from main storage. Separable, but not necessarily independent, modules are associated with various functional sets.

The external main storage interface electrical lines are grouped into cables. These cables connect the adapter with the master unit (i.e., a point-to-point connection).

The lines in the external main storage interface of FIG. 5 are divided into two categories: information sources 44 – 52, and tag lines 54.

Information Sources

Information sources are buses or single lines which carry information used in data-transfer sequences. They are described as follows.

Data Bus: The Data Bus 44 is a 2-, 4-, 8-, or 16-byte wide bus used for the transfer of bytes to or from main storage. The Data bus is completely parity checked, with odd parity being maintained on each byte transferred. The Data bus is bi-directional in that the master adapter 40 both sends and receives bytes on it.

Storage Address Bus: The Storage Address Bus 46 is a 3-byte wide bus used to provide a main storage address. The Storage Address Bus is completely parity checked, with odd parity being maintained on each byte of the bus. An address signalled by the Storage Address Bus must be even. Therefore, the low order byte of the Storage Address Bus contains only seven bits plus parity, the low order bit being elided.

The bytes in the Storage Address Bus are numbered 1, 2 and 3 with byte 3 being the least significant. The bits within the Storage Address Bus are numbered 8–15 and P1 in byte 1, 16–23 and P2 in byte 2, and 24–30 and P3 in byte 3. When a 0 is concatenated to the lower end of bits 8–30 of the Storage Address Bus, the result is a System/370 main storage address.

Key Bus: The Key Bus 48 is a 5-bit bus (four information bits plus parity) used to transmit a storage protection key. Odd parity is maintained on the Key Bus.

Mark Bus: The Mark Bus 50 contains several lines which carry signals to be used as parameters on a "store sequence" (they are not used on a "fetch sequence"). The lines in the Mark Bus are called mark lines. The Mark Bus has one parity line plus one mark line per byte of width of the Data Bus. If R is the Data Bus width in bytes, then the mark lines are numbered P, 0, 1,...,R-1. A signal on mark line 0 indicates that the byte on Data Bus byte 0 is to be stored at the main storage location indicated by the Storage Address Bus. A signal on mark line 1 indicates that the byte on Data Bus byte 1 is to be stored at location indicated by the Storage Address Bus plus 1. Similar remarks apply to mark lines 2,..., R-1.

On a store sequence, the master adapter must insure proper parity only on those bytes of the Data Bus corresponding to the mark lines which it has raised. It must also insure odd parity on the Mark Bus as a whole. The master adapter drives only those Mark lines corresponding to the portion of the Data Bus it utilizes on storage sequences.

Data Transfer Check Bus: The Data Transfer Check Bus 52 is a 4-bit bus (three information bits and a parity bit) used by the adapter to signal check indications. These check indications describe the nature of any check detected by the adapter or main storage during a data transfer sequence. Odd parity is maintained on the Data Transfer Check Bus when checks are signalled.

Prefix Request A: This line is part of the I/O feature of the External Main Storage Adapter. It is raised to indicate that the master unit is fetching or storing the Channel Address Word, the Channel Status Word, or the contents of the I/O communications area. The adapter must provide the prefix of its CPU on such a request.

Prefix Request B: The same as Prefix Request A.

Master units of various 'natural' data widths may be attached to an external main storage interface of width R. A given master unit has a width of S bytes (S may be 2, 4, 8, or 16). The only restriction is that S not be greater than R.

For example, if an interface is 8 bytes wide (R=8), then 2-, 4-, or 8-byte wide units may attach to it.

The 8-byte master unit utilizes Data Bus bytes 0–7 and mark lines P and 0–7. The 4-byte unit utilizes only Data Bus bytes 0–3 and mark lines P and 0–3. The 2-byte unit utilizes Data Bus bytes 0–1 and mark lines P and 0–1.

If an address indicated by a unit on the Storage Address Bus has K low order zeros, the unit refers to a contiguous block of 2, 4, 8 or 16 main storage bytes, depending on whether K is 1, 2, 3, or 4.

Imagine that a byte of data is to be stored at main storage location 15 in the preceding example. If the 2-byte unit is to store the byte, it places the byte on Data Bus byte 1, raises mark line 1, and indicates address 1110 (binary) on the Storage Address Bus. If the 8-byte unit is to store the byte however, it places the byte on Data Bus byte 7, raises mark line 7 and indicates address 1000 (binary) on the Storage Address Bus. The adapter must insure that the byte is routed to main storage location 15 in either case (it makes the proper routine by examining the three low order bits of the address indicated by the Storage Address Bus. The data are shifted (in some fashion) to the right by as many bytes as are indicated by the binary number represented by these bits. The mark lines must be right shifted by a like number of bits).

Similarly, if a byte of data is requested from main storage location 15, the 2-byte unit indicates address 1110 (binary) on the Storage Address Bus. The adapter gates main storage bytes 14 and 15 to Data Bus bytes 0 and 1. The 8-byte unit indicates address 1000 (binary) on the Storage Address Bus. In this case, main storage bytes 8–15 are to be placed on Data Bus bytes 0–7.

An external main storage adapter without the I/O feature does not provide receivers for the Prefix Request A or B lines. This allows for these functions to be partitionable.

Tag Lines

The tag lines 54 carry signals used to control the data transfer sequence. They normally signal the presence of signals on the various information sources. They are described as follows.

Store Request A: Store Request A is raised by the master unit to indicate that data are to be stored in main storage. The data are on the Data Bus, the storage address is indicated by the Storage Address Bus and the storage protection key is on the Key Bus. The Mark Bus provides control parameters.

Fetch Request A: Fetch Request A is raised by the master unit to indicate that data are requested from main storage. The storage address is indicated by the Storage Address Bus and the storage protection key is on the Key Bus. The data are to be gated to the Data Bus.

Bus Response A: Bus Response A is raised by the adapter in response to Store Request A or Fetch Request A to indicate that the unit need no longer gate information to the interface buses in connection with the request.

Data Transfer Response A: Data Transfer Response A is raised by the adapter in response to Store Request A or Fetch Request A. When Data Transfer Response A is raised in response to Store Request A, it indicates that the data have been stored and that no checks were detected during the data transfer sequence. When Data Transfer Response A is raised in response to Fetch Request A, it indicates that the requested data have been gated to the Data Bus and that no checks have been detected during the data transfer sequence.

Data Transfer Check A: Data Transfer Check A is raised by the adapter in response to Store Request A or Fetch Request A to indicate that checks were detected during the data transfer sequence. It is normally raised only after indications describing the nature of the checks have been placed on the Check Bus. If Data Transfer Check A is raised in response to Fetch Request A, the requested data may or may not appear on the Data Bus.

Store Request B: Mutatis mutandis, word-for-word the same as Store Request A.

Fetch Request B: Mutatis mutandis, word-for-word the same as Fetch Request A.

Bus Response B: Mutatis mutandis, word-for-word the same as Bus Response A.

Data Transfer Response B: Mutatis mutandis, word-for word, the same as Data Transfer Response A.

Data Transfer Check B: Mutatis mutandis, word-for-word the same as Data Transfer Check A.

The A set of tag lines is the basic set. The B set of tag lines is provided for pipelining of data transfer between the external main storage adapter.

Control Interface

Figure 4:
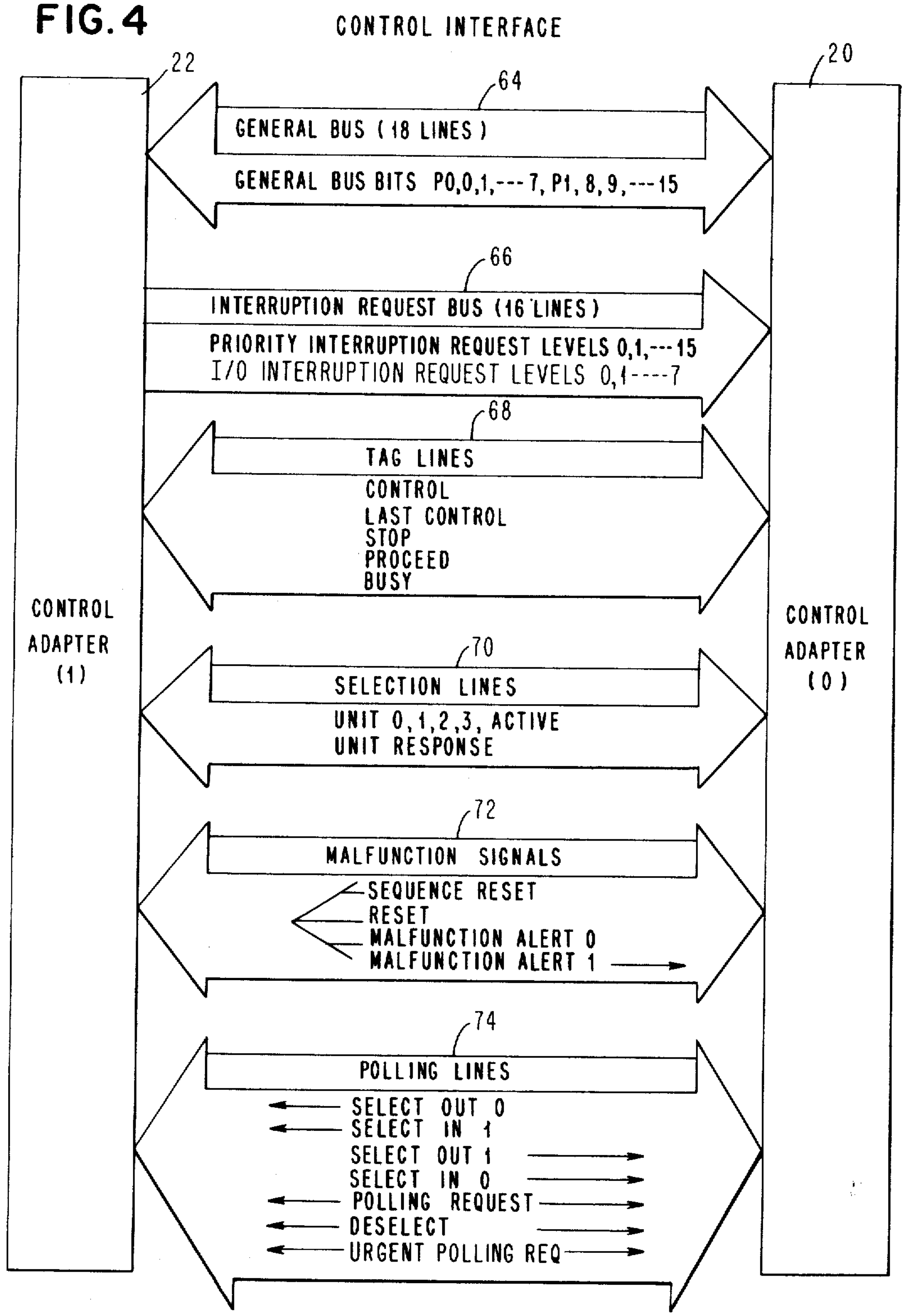
FIG. 4 is a detailed drawing showing all of the lines interconnecting the control adapters.

Referring to FIG. 4, the control interface lines are grouped into four categories: polling group 74; selection group 70; control group 64, 68, 72; and interruption request group 66.

Polling Group

The lines in the polling group 74 are used to allocate temporary control of the control interface. All units attached to the interface by means of control adapters are potentially equal. Consequently, no unit may assume permanent control of the interface. Furthermore, interface polling in logically circular (i.e., if there are three attached units, the first unit passes the poll to the second, the second to the third, and the third back to the first).

For a given unit, the next unit in line is the unit to which it passes the poll. The preceding unit is the unit which passes the poll to the given unit. A unit has the poll when it accepts the poll from a preceding unit. A unit may not initiate a control transfer sequence unless it has the poll.

The lines in the polling group are.

Select Out: A unit which has the poll raises its Select Out to pass the poll to the next unit in line. The Select Out line from a unit becomes the Select In line for the next unit in line. A unit not having the poll and wishing to allow the poll to pass to the next unit in line raises its Select Out when its Select In rises.

Select In: A unit receives a signal on its Select In line when the poll is being passed to the unit from a preceding unit.

Deselect: A unit raises its input to the Deselect line in response to the rise of its Select In line to signal that it is accepting the poll.

Polling Request: Polling Request is raised by a unit to indicate that it wishes to obtain the poll in order to initiate interunit communication.

Selection Group

The lines in the selection group 70 allow selective communication between two units attached to the control interface. Each attached unit is assigned a unique unit number. The possible unit numbers are 0, 1, 2 and 3. The lines in the selection group are.

Unit $n$ Active: Four Unit $n$ Active lines (where $n=0$, 1, 2, or 3) are defined to allow the identification of units communicating on the control interface. A unit raises the Unit $n$ Active line corresponding to its own unit number to indicate that it is initiating a control transfer sequence. The initiating unit also raises the Unit $n$ Active line corresponding to the unit number of another attached unit, thus selecting that unit for communication. A unit attached to the control interface should degate its interface inputs, with the exception of the polling, interruption request, and metering lines, when its Unit $n$ Active line is down.

Unit Response: The Unit Response line is used by a selected unit to respond to a signal on its Unit $n$ Active line. The selected unit must raise Unit Response within 80 nanoseconds of the rise of its Unit $n$ Active line. Unit Response must remain up until the fall of that Unit $n$ Active line. It must then fall within 80 nanoseconds of the fall of the Unit $n$ Active line.

The lack of a response on Unit Response may be used to detect a "not operational" condition in the selected unit. In detecting such a condition, the initiating unit must provide the delay required to accommodate the signal transmission delay caused by, inter alia, the interface drivers, cables, and receivers. This delay is in addition to the 80 nonosecond response time mentioned previously. In general, one microsecond of delay is required before detecting a not operational condition.

Control Group

The lines in the control group include bus lines 64, tag lines 68 and malfunction signals 72.

The bus lines 64 are:

General Bus: The General Bus is a 2 byte wide bus used during control transfer sequences for: the transfer of control information from an initiating unit to a selected unit, and the return of status information by that selected unit.

The General Bus is parity checked with odd parity being required on each byte of the bus.

The tag lines 68 are:

Control: Control is a tag line used during a control transfer sequence to indicate the presence of control or status information on the General Bus. Furthermore, Control indicates that the sending unit has further information to transmit if the receiving unit so desires.

Last Control: Last Control has the same meaning as Control with a single exception. Last Control indicates that the information on the General Bus is the final information that the sending unit will transmit.

Proceed: Proceed is a line raised during a control transfer sequence to signal the acceptance of information on the General Bus. It is raised only in response to Control and signals that the receiving unit does indeed wish that further information be sent.

Stop: Stop is a line raised in response to Control or Last Control to signal the acceptance of information on the General Bus. Further, it indicates that no further information should be sent.

Busy: Busy is a line raised by a unit selected in a control transfer sequence to indicate that it cannot now communicate because it is busy.

Clock Out: Clock Out is a line (not shown in FIG. 4) from the control adapter to the attached units and is used to provide the CPU interlock control necessary for changing the enable/disable states of attached channels (signal must be down to permit changing states). In addition, the attached channel's transition between the enabled and disabled state requires the same prevailing conditions as for the off line/on line transition.

The down state of Clock Out must be at least 1 microsecond in duration.

Metering In: Metering In (not shown in FIG. 4) is a line from the attached channels and is used to condition the CPU meter for operation. The Metering In signal originates from each I/O device and/or the attached unit and is generated by the device from the time of acceptance of a command until the generation of Device End for that command. Metering In may be raised concurrently with Unit Response for any interface signalling sequence that does not involve Device End, such as Test I/O. If raised, the duration of the signal must not exceed that of Unit Response.

Metering In will not be raised:

1. between the generation and acceptance of Device End;
2. between the generation of Device End and the acceptance of the next command during chaining;
3. while a device is awaiting initiation of an automatic start; for example, transmission control units do not necessarily activate Metering In during the idle portion of prepare commands.

Metering Out: Metering Out is a line (not shown in FIG. 4) from the control adapter to the attached channel and is used to condition all other meters in assignable units and I/O units. Metering Out is raised whenever the CPU meter is recording time.

The malfunction signal lines 72 are:

Reset: A control adapter raises Reset to signal that the attached units should sever all communication with the CPU. Any communication sequence in progress (between the unit and the control adapter) is terminated immediately. All inputs to the control interface (except Reset) are reset immediately. The attached unit may keep any stand-alone capability it has, but should not initiate any further communication or data transfer sequences with the signalling control adapter.

Sequence Reset: A communication control adapter or attached unit raises Sequence Reset to signal a control interface malfunction and to reset any control interface sequence in progress.

Unit Operational: Four Unit Operational lines (not shown in FIG. 4), numbered 0, 1, 2, and 3, are provided. An attached unit raises the Unit Operational Line corresponding to its unit number whenever it is operational and not malfunctioning (i.e., when its power is on and it is not in a Check Stop state). The fall of a unit's Unit Operational line provides a malfunction alert signal to all other attached units.

Interruption Request Group

The lines in the interruption request group 66 are used by a single unit to signal interruption request to a unique control adapter. These lines are optional. The lines are:

Priority Interruption Request Bus: The Priority Interruption Request Bus is a 16 bit wide bus used by a unit to request the initiation of a priority interruption of a CPU. The lines in the bus indicate the priority (0–15) level of the request. Each of these lines connects logically to the corresponding priority level mask bit in the CPU.

I/O Interruption Request Bus: The I/O Interruption Request Bus is an 8 bit wide bus used by a unit to request the initiation of an I/O interruption of a CPU. The lines in the bus indicate the channel number (0–7) for the request. Each of these lines connects logically to the corresponding channel mask bit in the CPU.

Source ID Bus: The requesting unit encodes its unit number on the Source ID Bus. This unit number is used to select the proper requesting unit in an interruption acceptance sequence. The bus contains three lines (two information and one parity) and must be valid before an interruption is accepted.

Control Adapter-CPU Interface

The control adapter 20 of FIG. 1 is connected to the instruction executer 12 of the central processing unit by means of the control adapter-CPU interface. The control adapter in conjunction with the CPU executes the SIGNAL PROCESSOR instruction described in the above-identified Moore et al patent application. Also, the control adapter executes I/O instructions such as start I/O.

The SIGNAL PROCESSOR instruction causes the control adapter to initiate a control-transfer sequence (described more fully in Reset Sequence with the subsystem specified by an address in the instruction. A condition code is set at the conclusion of the sequence. If the return code is 1, status is stored in the status registers indicated by the SIGNAL PROCESSOR instruction.

The control-transfer sequence initiated by the SIGNAL PROCESSOR instruction provides for the passing of the following control information to the addressed subsystem:

a signal identifying the instruction as SIGNAL PROCESSOR;

the function code indicated by the SIGNAL PROCESSOR instruction; and the parameter indicated by the SIGNAL PROCESSOR instruction.

At the conclusion of the control-transfer sequence the addressed subsystem returns status information to the control adapter. If the status information is not all 0's, it is placed in the status register indicated by the SIGNAL PROCESSOR instruction. The adapter then sets the proper condition code.

I/O Instructions

The control adapter also excutes I/O instructions such as start I/O, start I/O fast release (described more fully in U.S. Patent application Ser. No. 267,754, by Blackwell et al., filed June 30, 1972, all more fully described in the above-identified System/360 Principles of Operation) test I/O, halt I/O, halt device, test channel, word store channel ID. When any of these I/O instructions are addressed to a channel attached to the control adapter the adapter initiates a control-transfer sequence with the addressed channel. At the conclusion of this sequence the adapter sets the proper condition code.

The control transfer sequence for an I/O instruction provides for the passing of the following information to the addressed channel:

a parameter identifying the particular I/O operation being executed; and the device address and extended device address derived from the instruction.

If necessary, the addressed channel uses the data passed to main storage (through the master adapter attached to the channel and the external main storage adapter attached to the main processor) to obtain the channel address word. The channel may also validate the channel status word and I/O communications area by means of the same data path. The channel returns a status byte to the control adapter from which the proper condition code is derived.

The addressing structure makes it not possible to address an attached unit which is not a data channel by means of an I/O instruction. This insures that I/O instructions and the SIGNAL PROCESSOR instruction are kept functionally separate.

CPU Interruptions

The control adapter, in conjunction with the control interface, can cause interruptions of the CPU to which it is attached. These interruptions are divided into two categories, priority interruption and I/O interruption.

Priority Interruptions

A subsystem attached to a control adapter which has the priority interruption logic may request interruption on several different levels simultaneously. These requests are matched with the proper priority interruption level masks where the interruptions are accepted selectively.

If a priority interruption is to be accepted on a given level, the control adapter initiates a control-transfer sequence with the unit which is requesting the priority interruption. This sequence provides for the passing of the following information to the requesting unit:

a signal identifying the sequence as a priority interruption acceptance sequence; and a signal indicating which level is being accepted.

A requesting subsystem supplies parameters associated with the interruption in the form of an operation request block address. The operation request block is more fully described in U.S. Patent application Ser. No. 268,959 entitled "Operation Request Block Usage", by B. B. Moore. The adapter using the proper prefix, stores the parameter and the interruption code in the main storage. An external interruption is then initiated and the program status word (PSW) exchange occurs in accordance with the interruption mechanism of the central processing unit.

Control adapters may request external interruptions of each other in connection with the SIGNAL PROCESSOR instruction. When such an interruption is initiated, the control adapter which accepts the interruption provides the processor number of the requestor as well as an external interruption code indicating a class 1 interruption. The priority interruption control transfer sequence is more fully described in Reset Sequence.

I/O Interruptions

A subsystem attached to the control adapter which has the appropriate I/O logic can request an I/O interruption of the control adapter's CPU. The request is matched with the proper I/O masks so that interruptions are accepted selectively.

If an I/O interruption is to be accepted, the control adapter initiates a control transfer sequence with the requesting subsystem. The sequence provides for the passing of the following information to the requesting unit:

a signal identifying the sequence as an I/O interruption acceptance sequence.

The requesting subsystem then stores the channel status word, the extended channel word, the extended channel status and validity. The requesting subsystem returns the device address and status summary. The adapter stores the interruption code using the proper prefix and the I/O interruption is then initiated by the interruption mechanism including a PSW exchange. It is not possible to accept an I/O interruption from an attached subsystem which does not have an I/O address. The I/O interruption control transfer sequence is more fully described in Reset Sequence.

Control Interface Sequences

Three control operations are performed over the control interface: polling, control transfer, and reset.

As described in Control Interface the control interface lines are separated to two groups: information sources comprising the general bus and the unit active lines and the tag lines comprising control, last control, proceed and stop.

When a subsystem is involved in one of the communication sequences, it sends information on one or more of the information sources. The sending unit accommodates skew on these sources by delaying the rise of the signal on a tag line by a time duration which insures that the information on the information sources precedes the signal on the tag line by a fixed delay, for example 60 nanoseconds. A receiving unit also provides a delay which accommodates the skew caused by its own circuitry and in addition provides for the delay of 60 nanoseconds.

Polling Sequence

The polling sequence is used when the control interface is not being used for inter-unit communication. The poll can be requested, but the polling sequence cannot be initiated by a unit which does not already have a poll. The polling sequence begins when the unit having the poll decides to pass the poll to a requesting unit. The unit may not pass the poll until all previously initiated polling, control transfer, and reset sequences have been completed.

Figure 8:
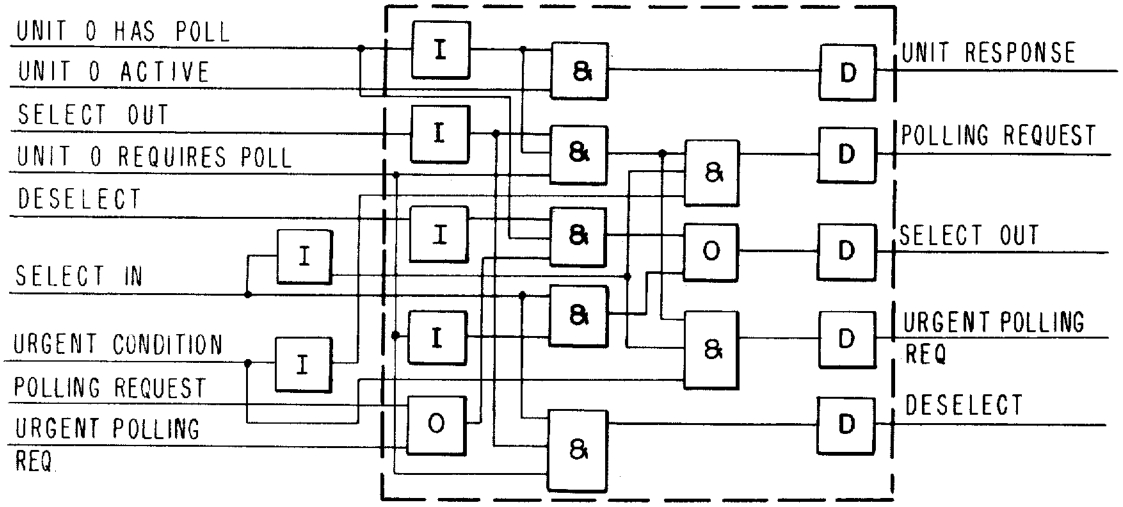
FIG. 8 is a detailed logic diagram of the polling lines illustrated in FIG. 4.
Figure 16:
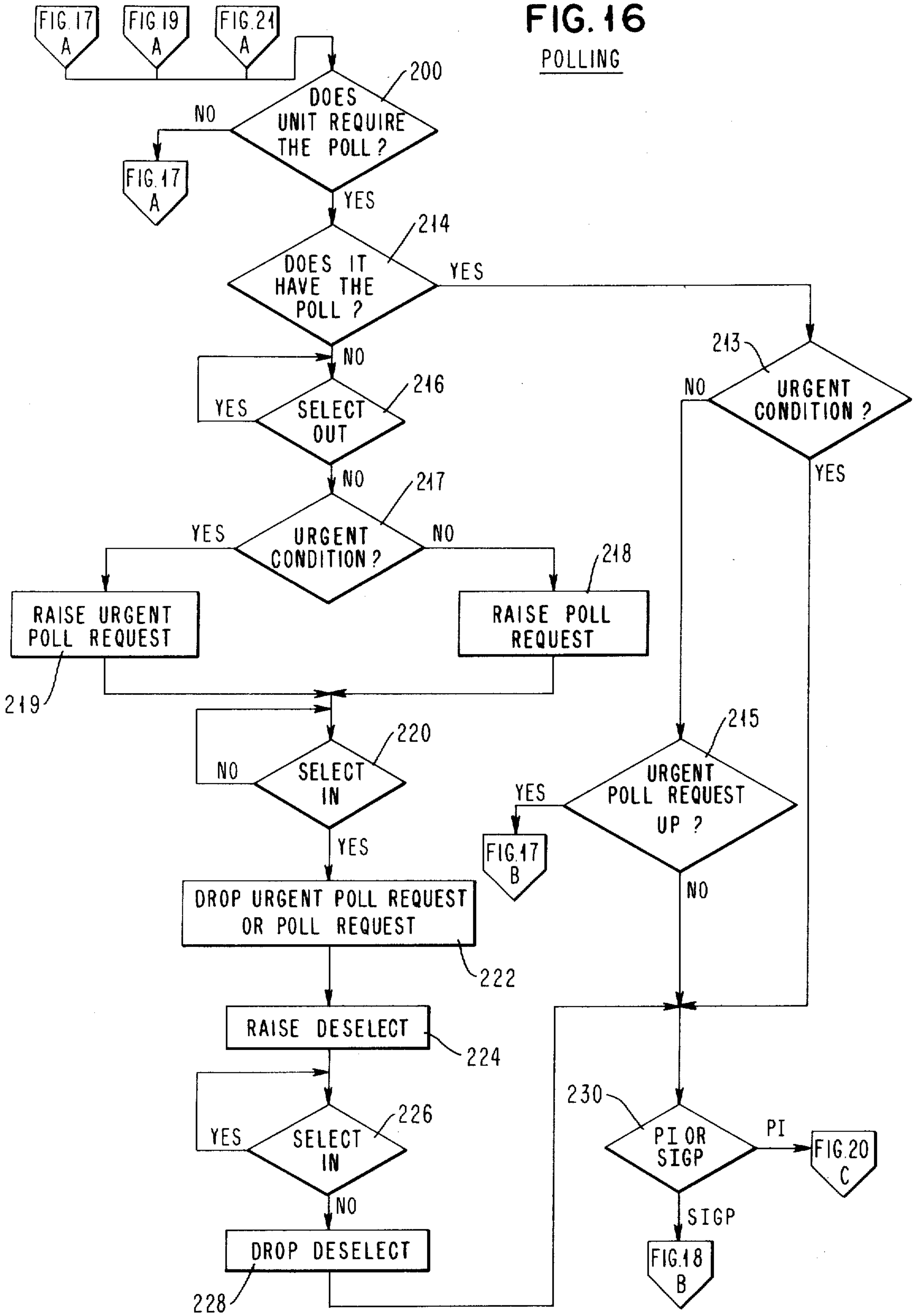
FIGS. 16 and 17 comprise a flowchart of a polling sequence.
Figure 17:
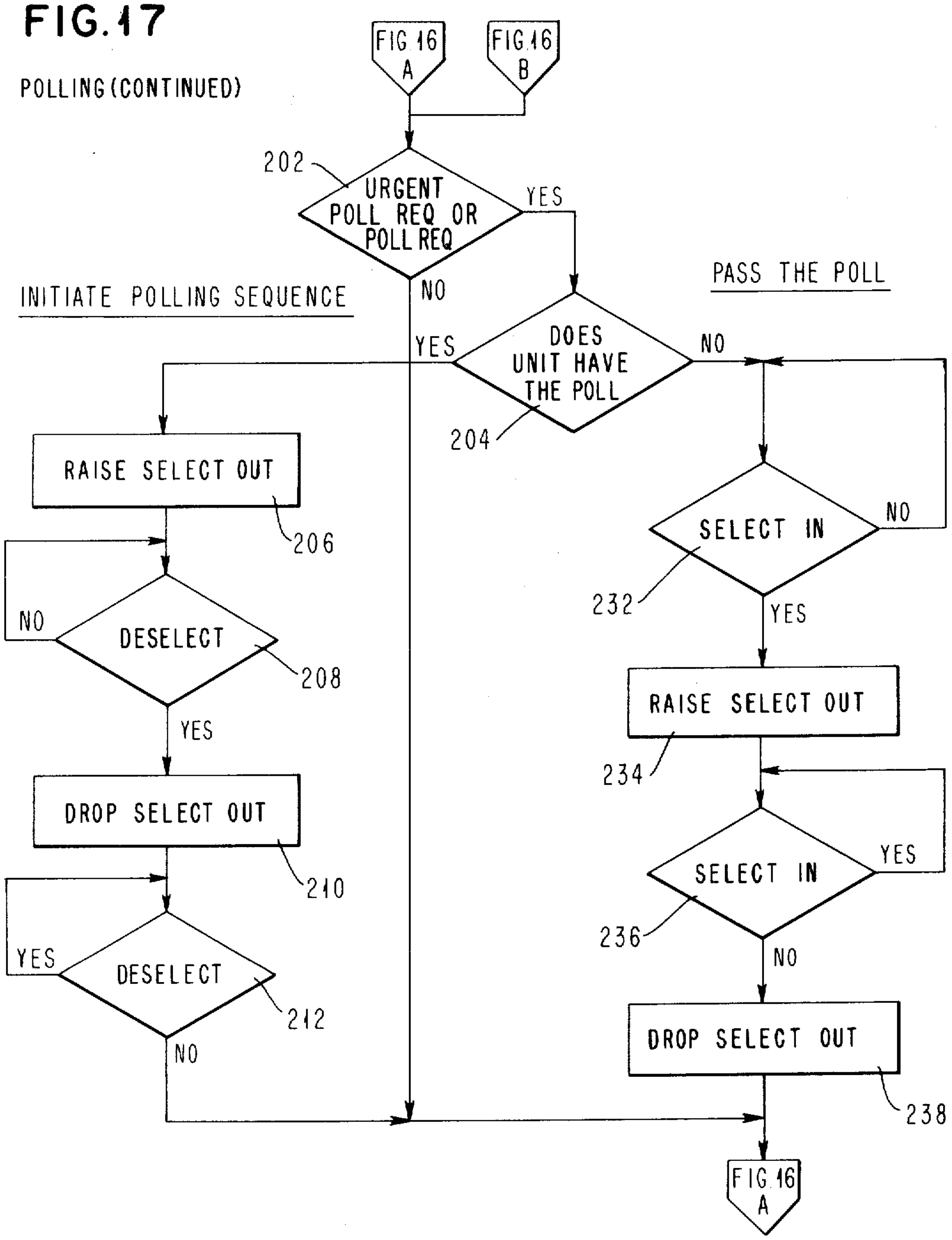
Figure 24:
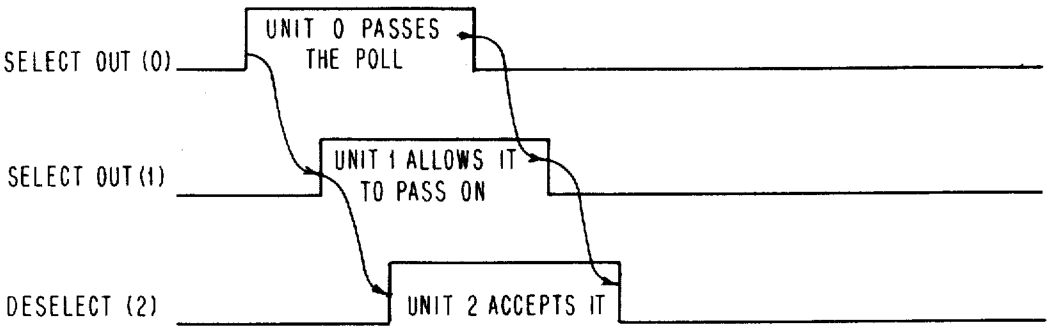
FIG. 24 is a timing diagram of a polling sequence.

The polling logic at the control interface is shown in FIG. 8. FIGS. 16 and 17 detail, in the form of logic flow diagrams, the logic which controls the interface sequences for polling. A timing diagram for polling is shown in FIG. 24.

Referring to FIG. 16 decision block 200 decides whether or not the unit requires the poll. If the unit does not require the poll the decision is no and the flow continues at FIG. 17. In decision block 202 (FIG. 17) a determination is made to see if the poll request line from another unit is energized. If yes, decision block 204 decides whether or not the unit has the poll. If yes, the unit initiates the polling sequence by raising its select out line, block 206. The signal on this line becomes the select in signal to the next control adapter (see FIG. 2). The unit passes the poll and no longer has the poll when it raises its select out line.

A unit receiving a signal on its select in line may either accept the poll or pass it along to the next unit in the line. A unit in line accepts the poll whenever it has an immediate need of the control interface to initiate a control transfer sequence.

The unit passes the poll along to the next unit in line if it does not wish to accept the poll. This is done by raising the select out line within a fixed delay, for example 80 nanoseconds, of the rise of the select in line to the unit.

A unit wishing to accept the poll does so by raising its deselect line within 80 nanoseconds of the rise of its select in line. A unit has the poll as soon as the deselect line rises. The rise of deselect is determined at decision block 208. As soon as deselect rises the initiating unit drops its select out signal, block 210, within 80 nanoseconds of the rise of deselect.

The accepting unit drops deselect within 80 nanoseconds of the fall of the select in signal (i.e., the dropping of select out at the initiating unit). The fall of deselect is illustrated by decision block 212. The flow then returns to FIG. 16.

If a unit requires the poll (block 200 FIG. 16) and it does not have the poll (block 214) and select out is down (block 216) the unit desiring the poll raises poll request, block 218. If an urgent condition is indicated as illustrated by block 217, the unit raises urgent poll request. In either event, the following sequence is the same.

When the unit receives a signal on its select in line, (block 220) it accepts the poll by dropping poll request 222 and raising deselect 224 within 80 nanoseconds of the rise of its select in line. The unit has the poll at the rise of deselect. While completing the polling sequence the accepting unit may initiate a control transfer sequence and may not pass the poll at this point since the polling sequence is incomplete.

The initiating unit drops its select out signal within 80 nanoseconds of the rise of deselect and this is reflected at the receiving unit by a fall of select in block 226. The requesting unit then drops its deselect line, block 228.

Figure 20:
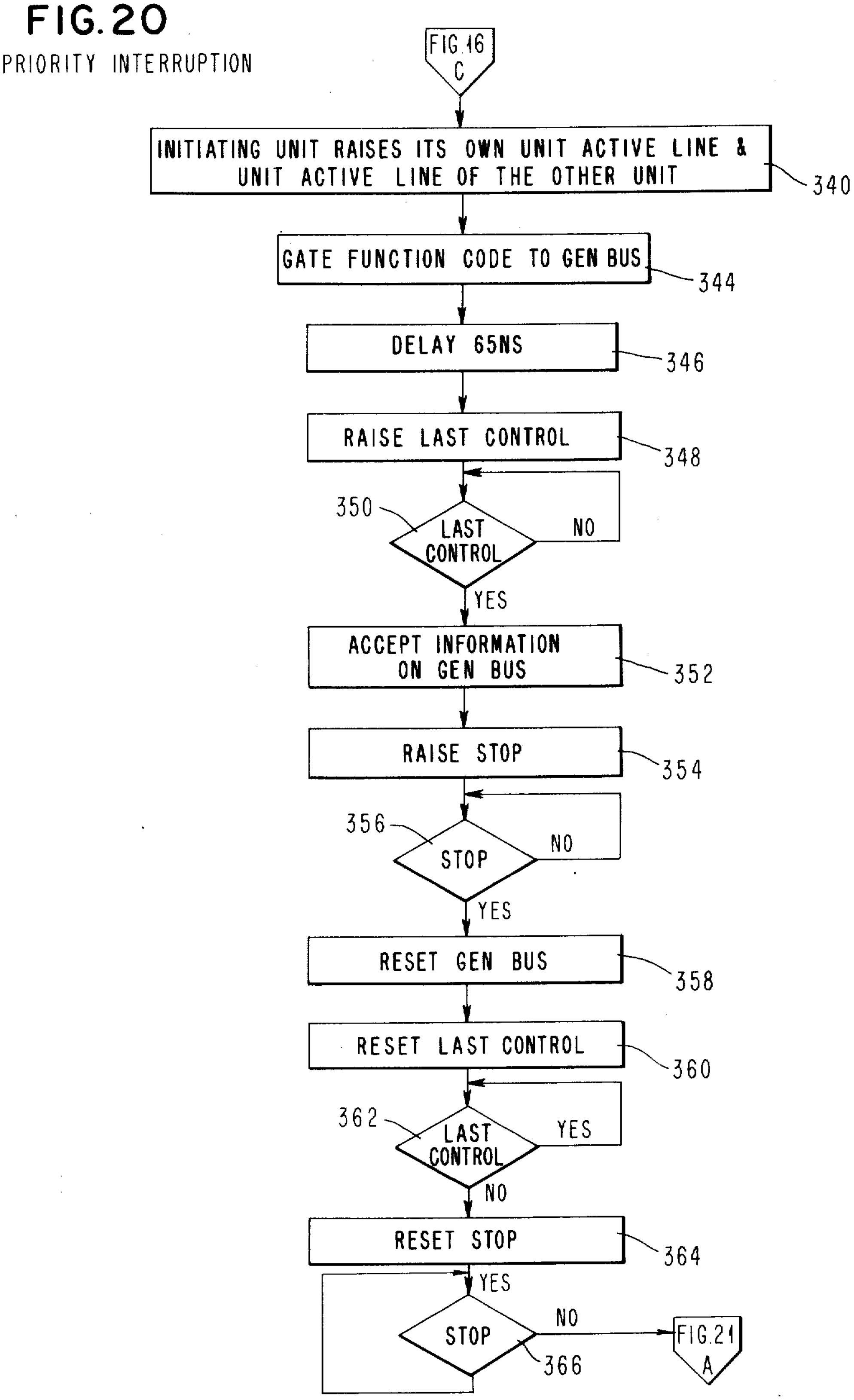
FIGS. 20 and 21 comprise a flowchart of a priority interruption acceptance sequence.
Figure 21:
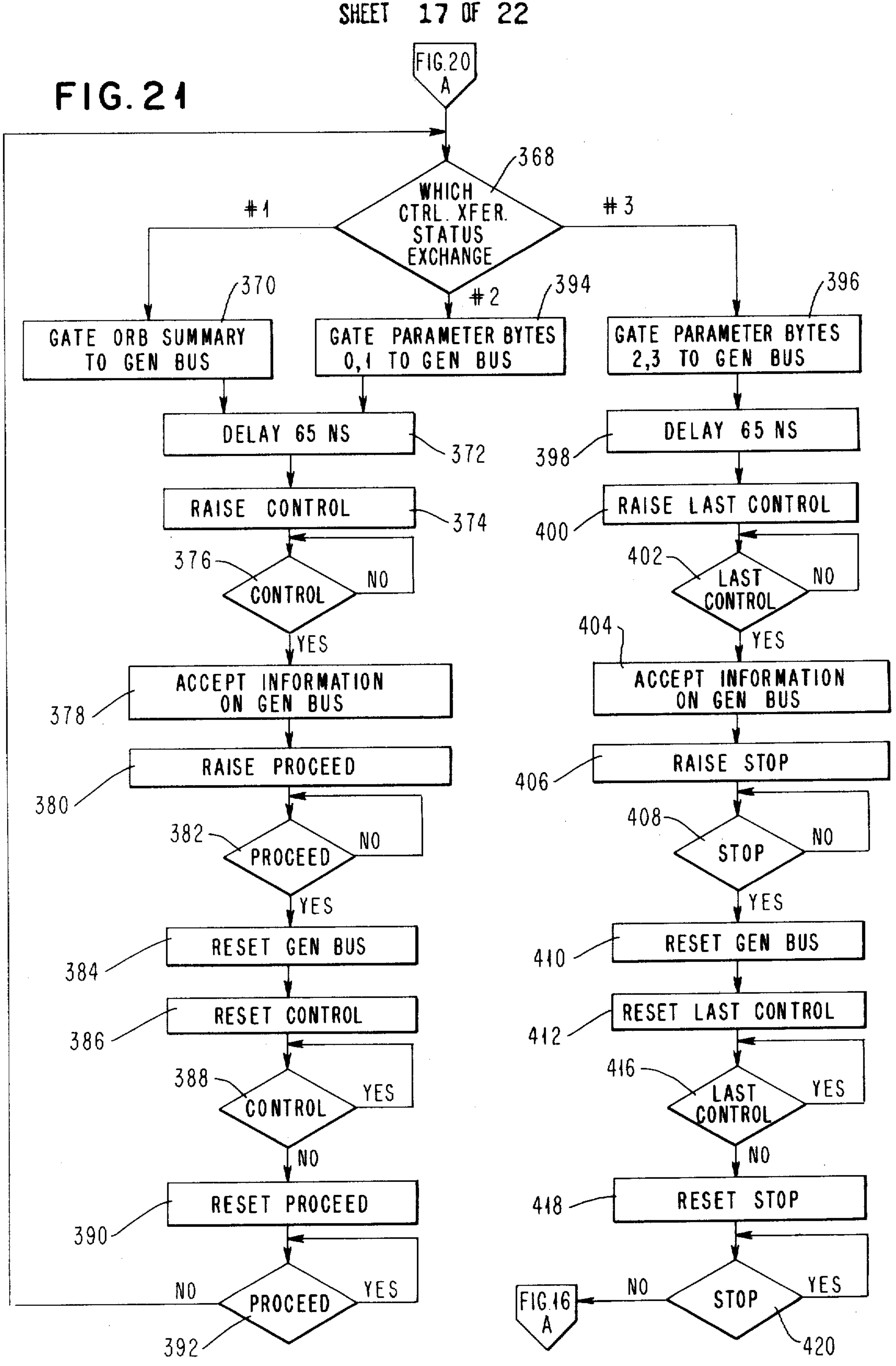

At block 230 the decision is made as to whether or not the next sequence is a priority interruption or a response to a SIGNAL PROCESSOR instruction. In the first case the flow proceeds to FIG. 20 which is described in Control Transfer Sequences. In the second case the flow proceeds to FIG. 18 wherein the control transfer sequence initiated by signal processor is described in Control Transfer Sequences.

Referring again to FIG. 17, at decision block 202 when a poll request is received by a unit which does not have the poll (decision block 204) the poll is passed along to the next unit in line. Thus when the unit receives a signal on select in, block 232, it passes the poll by raising its select out line 234 within 80 nanoseconds of the rise of select in.

The initiating unit drops its select out signal which is reflected as a drop of select in at the requesting unit decision, block 236. The unit then completes the sequence by dropping select out at block 238. The flow then reverts back to FIG. 16.

Referring again to FIG. 16, if a unit has the poll (block 214), the flow proceeds to block 213 in which a decision is made as to whether or not the unit having the poll also has an urgent need to retain it. If yes, the flow proceeds as previously described. If no, the logic then tests to see if urgent poll request is up at block 215. If yes, then the unit having the poll allows itself to be interrupted and passes the poll to the requesting unit as described with respect to FIG. 17.

Whenever a unit having the poll has completed the polling sequence, and is not involved in any control transfer sequence and no reset sequence is in progress it may:

initiate a control transfer sequence;

pass the poll; or hold the poll until polling request rises.

In some circumstances no unit down the line accepts the poll when it is passed. If the poll is not accepted the select out signal will be returned to the initiating unit where select in rises in response thereto. The initiating unit then resets its select out. The polling sequence is thus complete 80 nanoseconds after the fall of the initiating units select in.

Control Transfer Sequence

A unit which has the poll may initiate a control transfer sequence to pass control information to an attached unit. The control information passed includes a parameter indicating a request to perform a function and some optional control information. The various control-transfer sequences are illustrated in timing diagrams FIGS. 25–28.

Figure 10:
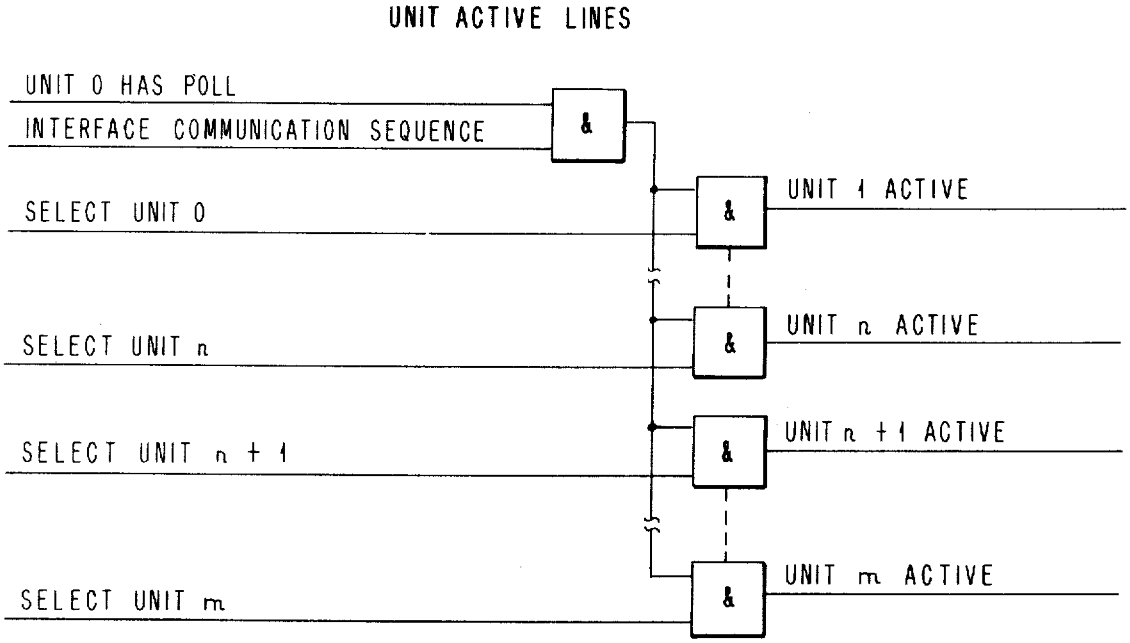
FIG. 10 is the logic circuitry for energizing the unit active line in response to the selection of a unit.
Figure 13A:
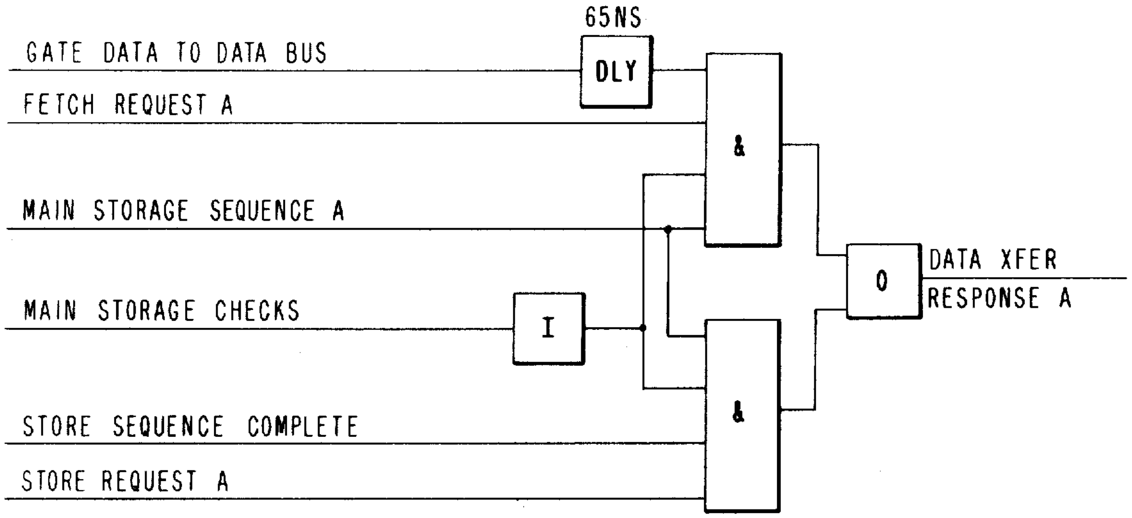
FIG. 13A is logic for the main storage adapter illustrated in FIG. 5.
Figure 13B:
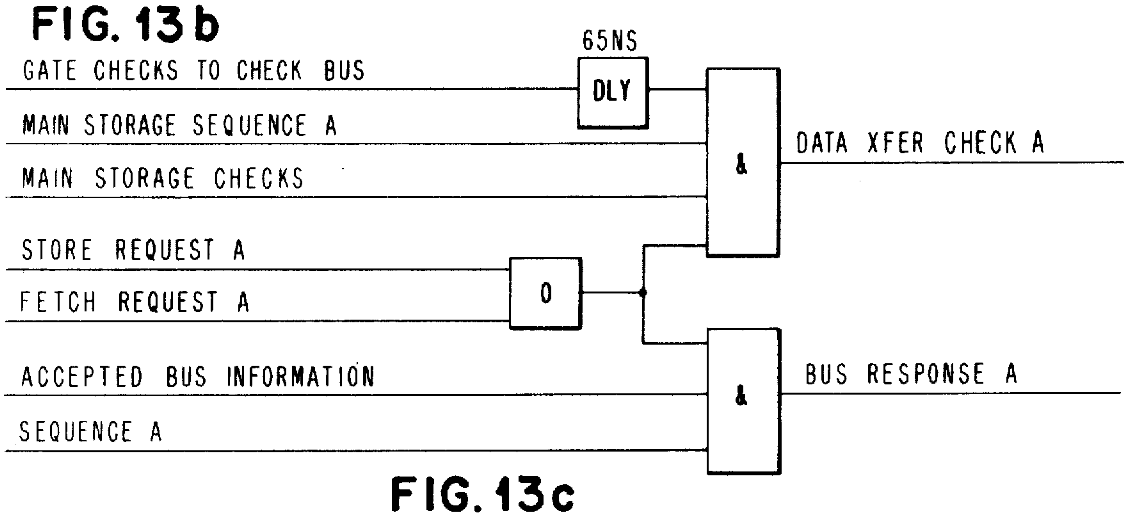
FIG. 13B is logic for the data transfer clock and bus response.
Figures 13C, 13D:
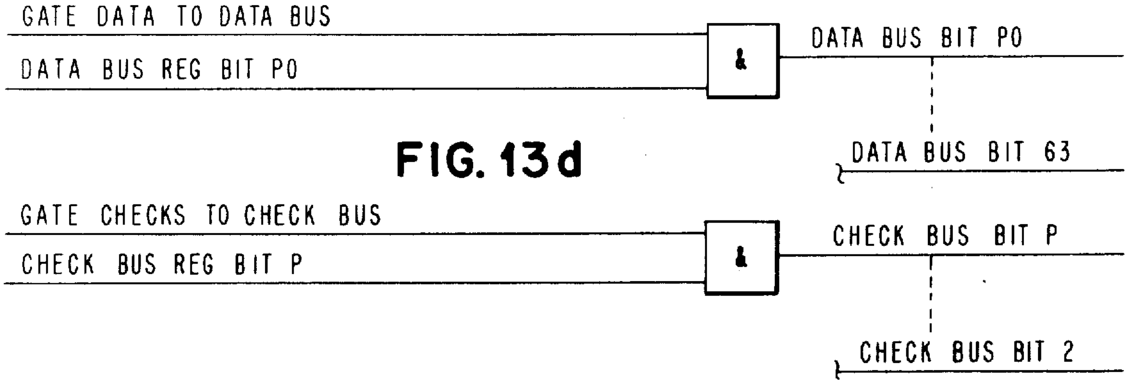
FIG. 13C is logic for the data bus bit positions P0 – 63.
FIG. 13D is logic for check bus bit P-2.
Figure 18:
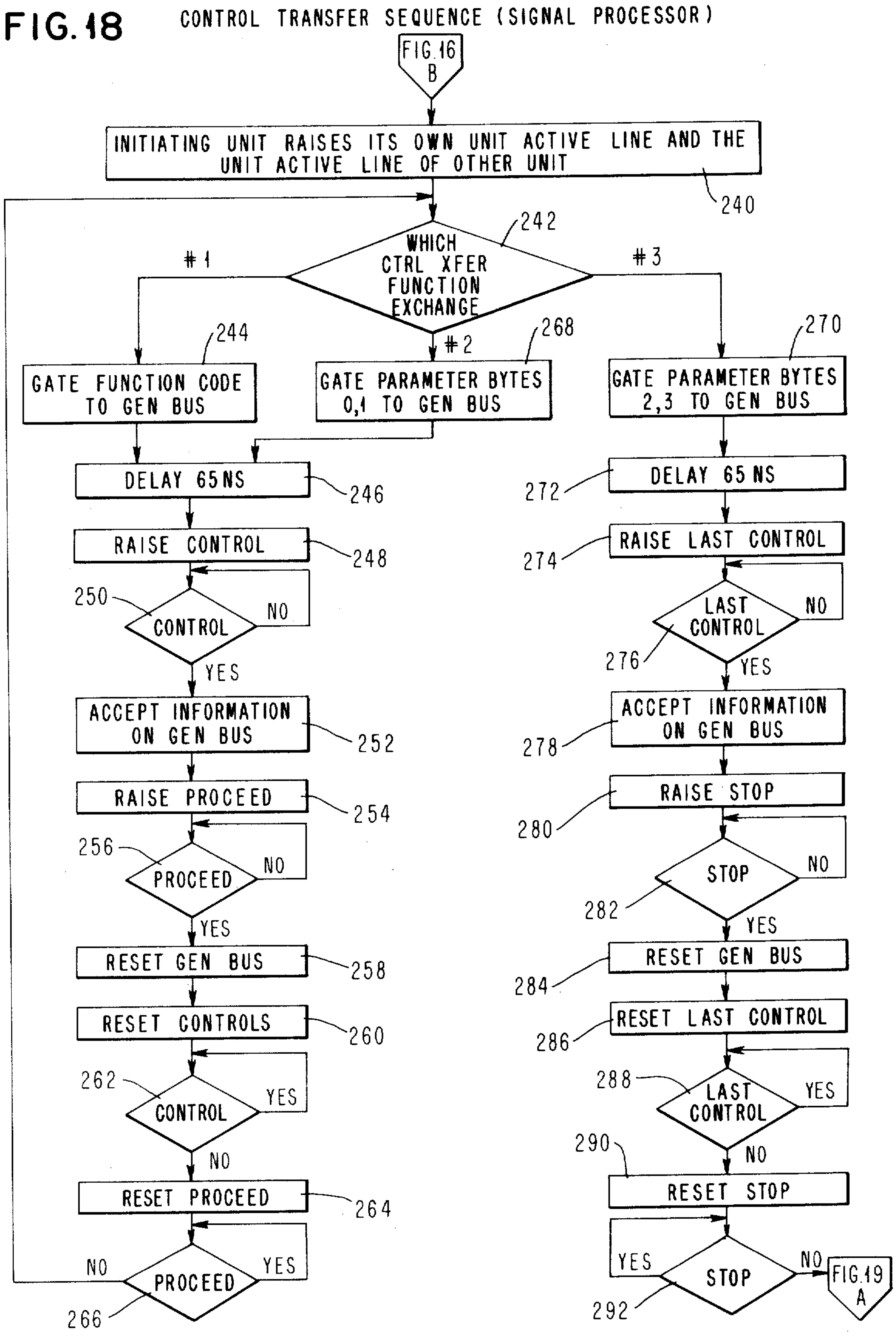
FIGS. 18 and 19 comprise a flowchart of a control transfer sequence initiated in response to a signal processor instruction.

Referring to FIG. 18, a unit may initiate a control transfer sequence whenever it has the poll, is involved in no other control transfer sequence and no reset sequence is in progress. The sequence is initiated at block 240 by raising the unit active line (see FIG. 10) and the unit active line of an attached unit. The selected unit responds to the rise of its unit active line by raising unit response (FIG. 8).

The initiating unit begins a control transfer function exchange, block 242, without waiting for the rise of unit response. Three separate paths are provided labeled 1, 2, 3. A short control sequence is provided (paths 1 and 2) wherein the initiating unit (unit 0) has further control information which it will send if the selected unit so desires. A longer control path No. 3 is provided for the case that the information currently on the general bus is the final control information that the initiating unit will transmit.

Following path No. 1, the initiating unit gates the function code to the general bus, block 244. After a delay of 65 nanoseconds, block 246, the unit raises a control block 248. (See also FIG. 6). When control rises at the accepting unit decision, block 250, (yes output) the accepting unit accepts the information on the general bus at block 252. If the selected unit wishes to signal a busy condition to the initiating unit it raises busy (see FIG. 11) in response to the rise of control. Otherwise, at block 254 the selected unit signals its acceptance of the information on the general bus by raising proceed (see also FIG. 11). The selected unit raises proceed only if it is responding to a signal on control and if it desires more control information to be transmitted by the initiating unit. If not, the selected unit raises stop (FIG. 11) to signal that no more control information is desired. The initiating unit in response to the rise of proceed at block 256 resets the general bus, block 258, and resets control, block 260. When control falls, block 262, the selected unit resets proceed block 264. At the fall of proceed at the initiating unit, block 266, the control reverts back to decision block 242. This control transfer function exchange is completed at fall of proceed.

If busy was raised by the selected unit the control transfer sequence is complete. However, if proceed was raised in response to control, the initiating unit begins another control transfer function exchange. If stop was raised the selected unit must initiate the first control transfer status exchange.

The second control transfer function is that of gating the parameter bytes 0, 1 (in the ORB-operation request block) to the general bus (block 242). The logic flow is the same as that previously described for the first control transfer function.

Figure 6:
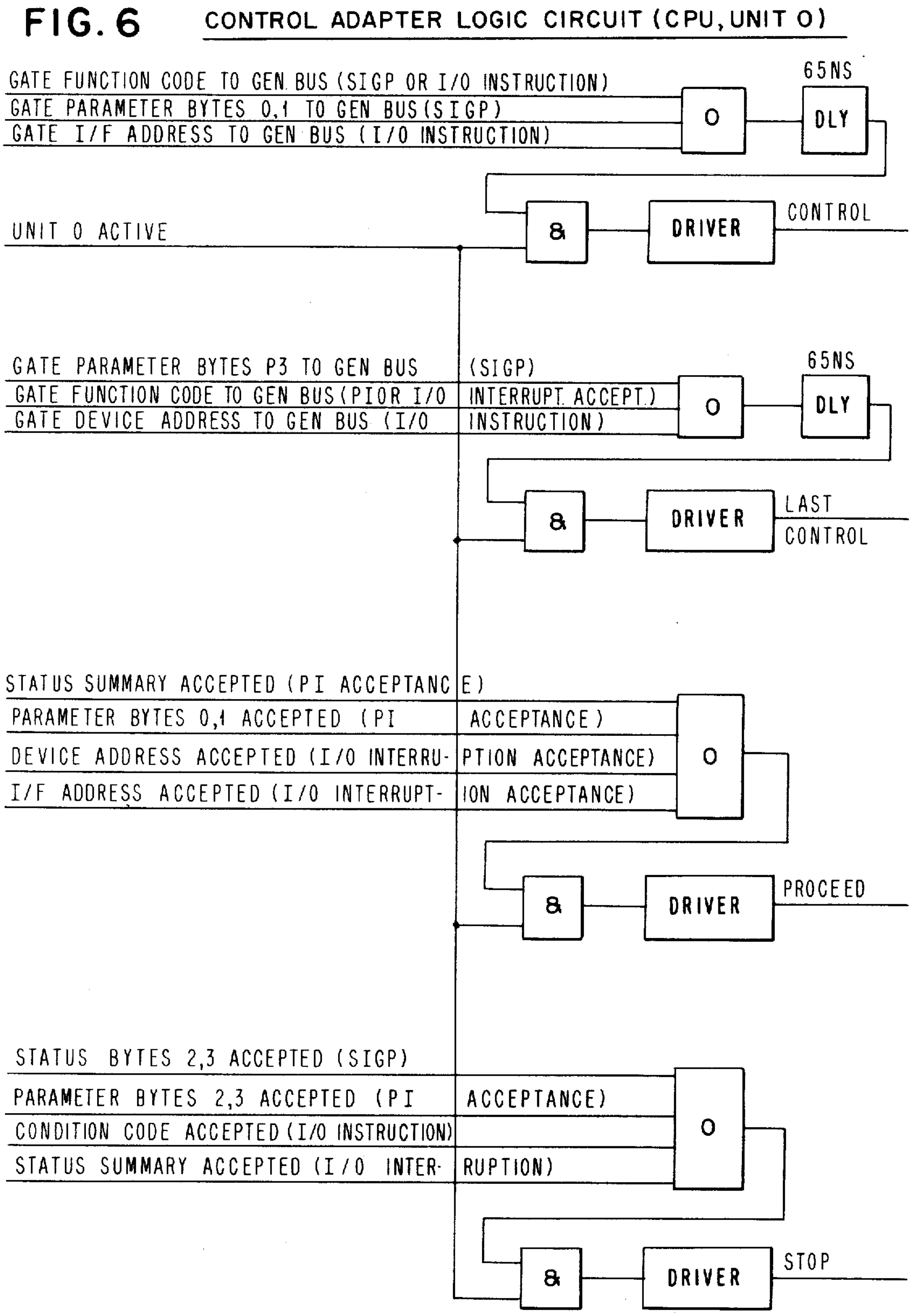
FIG. 6 is a detailed block diagram of the control adapter logic circuitry.
Figure 7:
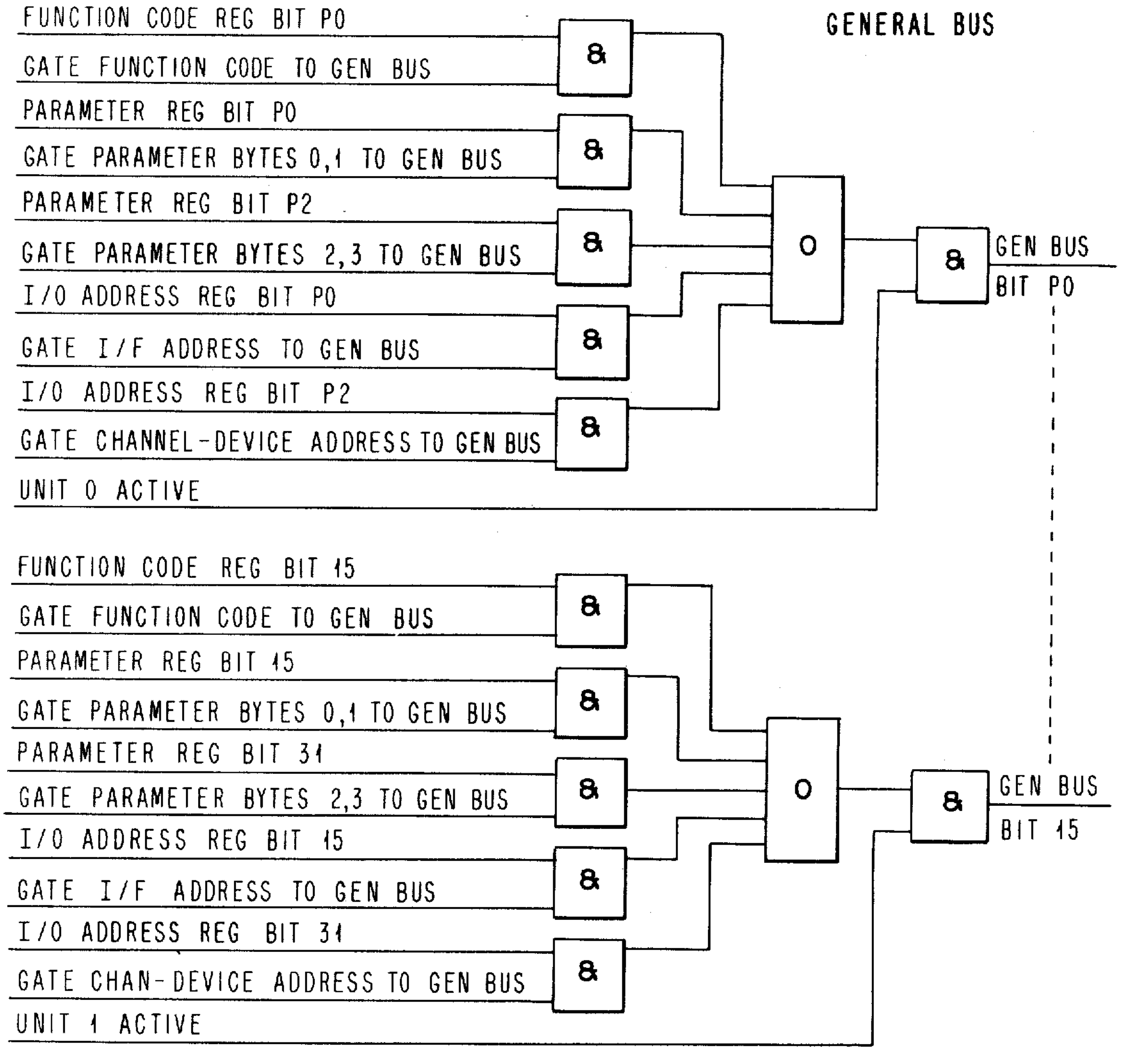
FIG. 7 is a detailed logic diagram of the logic associated with the general bus of FIG. 4.
Figure 19:
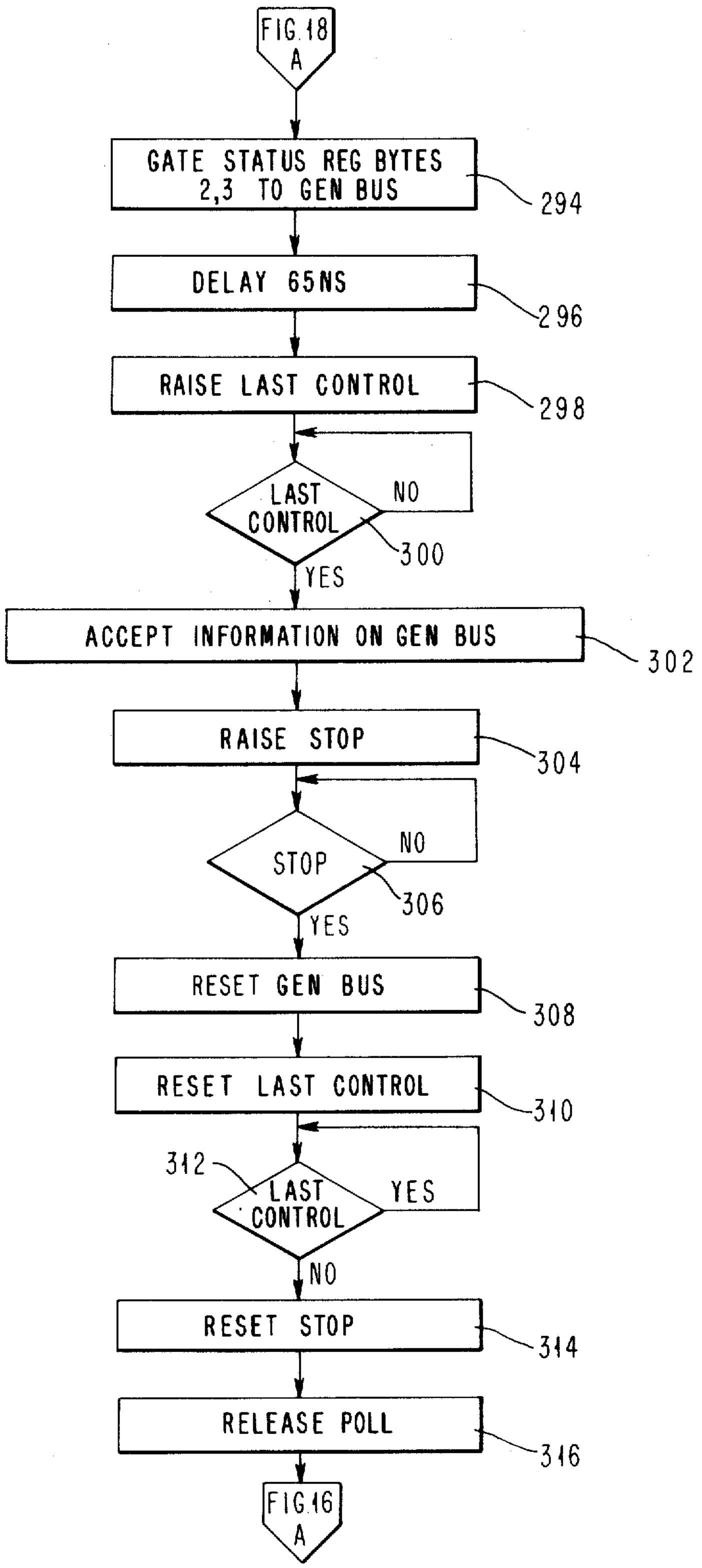

The third control transfer function involves gating the parameter bytes 2, 3 to the general bus, block 270, and involves a long sequence. After a delay of 65 nanoseconds, block 272, the initiating unit raises (block 274) the last control line (FIG. 6). When last control rises at the selected unit, block 276, the selected unit accepts the information on the general bus block 278, and, at block 280, raises stop (FIG. 11). When stop rises at the initiating unit, block 282, the initiating unit resets the general bus, block 284, and resets last control, block 286. When last control rises at the selected unit, block 288, the selected unit resets stop, block 290. When the stop line drops at the initiating unit, block 292, the data flow continues in FIG. 19.

The selected unit (Unit 1, FIG. 11) begins a control transfer status exchange by gating the proper information to the general bus. This is illustrated by block 294, FIG. 19, at which the status register bytes 2 and 3 are gated by the selected unit to the general bus. After a delay of 65 nanoseconds, block 296, the selected unit, at block 298, raises last control, FIG. 11. When last control rises at the initiating unit, block 300, the initiating unit accepts the information on the general bus, block 302, and, at block 304, raises stop. When stop rises at the selected unit, block 306, the selected unit resets the general bus, block 308, and resets last control, block 310. When last control falls at the initiating unit, the initiating unit resets stop, block 314 and releases the poll, block 316, and the control path returns to the polling mode, FIG. 16.

As described above, the selected unit raises last control to gate the status information to the initiating unit. Control can be raised in case the selected unit has further status information which it will send if the initiating unit so desires.

Last Control is raised only in the case that the information currently on the general bus is the final status information that the selected unit will transmit. The initiating unit generally signals its acceptance of the information on the general bus by raising stop. However, the initiating unit may raise proceed if it is responding to control and desires that more status information be sent by the selected unit. otherwise, the initiating unit raises stop to signal there is no more status information desired. The selected unit resets the general bus, control and last control at the rise of proceed or stop. The selected unit resets its proceed and stop at the fall of control and last control. The control transfer status exchange is thus complete at the fall of proceed or the fall of stop.

Figure 9A:
FIG. 9A illustrates the malfunction alert line.
Figure 9B:
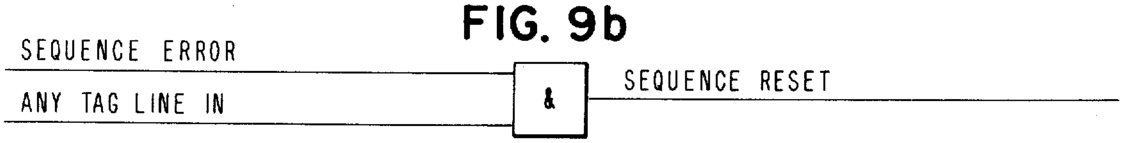
FIG. 9B illustrates the conditions for raising the sequence reset line.

If the proceed was raised in response to control, the selected unit initiates another control transfer status exchange. If stop was raised, however, the control transfer sequence is terminated and the initiating unit resets its unit active lines (FIG. 9) at the fall of control and last control. The control transfer sequence is complete at the fall of the unit active lines.

Signal Processor

Figure 25:
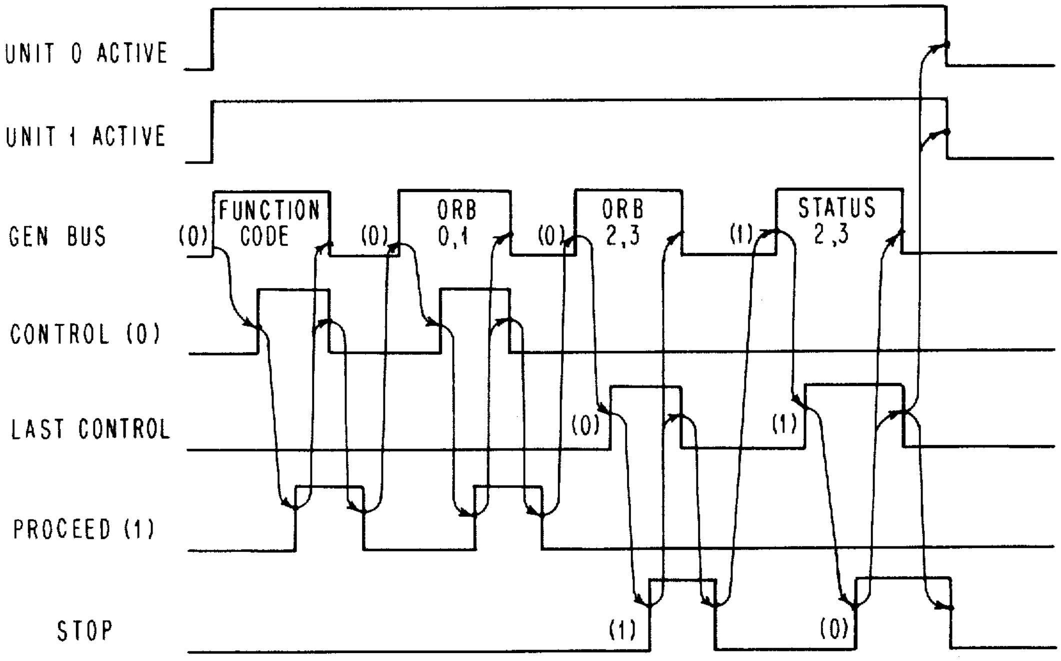
FIG. 25 is a timing diagram of the control transfer sequence for signal processor.
Figure 26:
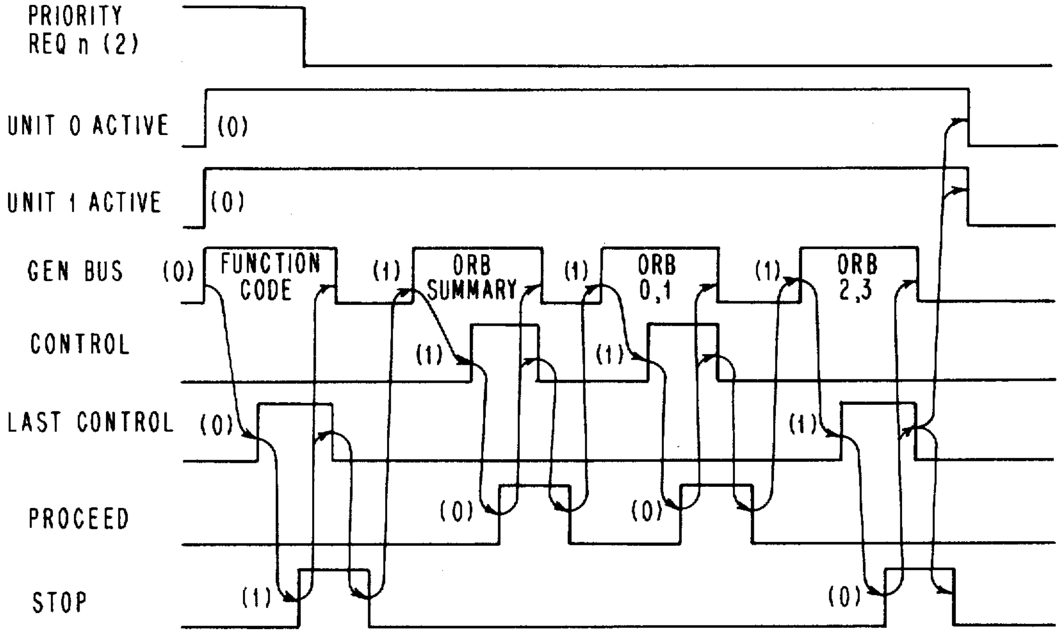
FIG. 26 is a timing diagram of the control transfer sequence for priority interruption.

When a SIGNAL PROCESSOR instruction causes a Control Adapter to initiate a control-transfer sequence, it tranmits up to 6 bytes of control information and accepts up to 3 bytes of status information in return (See timing diagram, FIG. 25).

The control bytes transmitted are derived from the SIGNAL PROCESSOR instruction. If the status bytes returned (there may be less than 3) are all zeros, a condition code of zero is set and no status is stored. If any status bits are 1, the status bytes returned by the adressed unit are stored in the status register and a condition code of 1 is set. The SIGNAL PROCESSOR instruction is more fully described in the above-identified Moore et al. patent application.

The General Bus bytes are as follows.

Control-Transfer Function Exchange 1:

Byte 0: Hexadecimal 01.

Byte 1: The Function Code from the instruction, The hexadecimal indications are as follows:

| | |
|---|---|
| 00 | Unassigned (Reserved) |
| 01 | SENSE |
| 02 | SET EXTERNAL LEVEL |
| 03 | EMERGENCY SIGNAL |
| 04 | START |
| 05 | STOP |
| 06 | RESTART |
| 07 | CPU RESET |
| 08 | INITIAL MICROPROGRAM LOAD |
| 09–OF | Unassigned (Reserved) |
| 10 | STORE PROCESSOR ID |
| 11 | START OPERATION |
| 12 | START IMMEDIATE OPERATION |
| 13 | HALT OPERATION |
| 14 | TEST OPERATION |
| 15–FF | Invalid (Reserved) |

Control-Transfer Function Exchange 2:

Byte 0: The ORB address, byte 0.

Byte 1: The ORB address, byte 1.

Control-Transfer Function Exchange 3:

Byte 0: The ORB address, byte 2.

Byte 1: The ORB address, byte 3.

Control-Transfer Status Exchange 1:

Byte 0: General bus byte 0 is placed in byte 2 of the status register. The bits in this byte have the following meaning:

| | |
|---|---|
| Bit 0 | Indirect Status in ORB |
| Bit 1 | ORB Check |
| Bit 2 | 0 (Reserved) |
| Bit 3 | 0 (Reserved) |
| Bit 4 | 0 (Reserved) |
| Bit 5 | 0 (Reserved) |
| Bit 6 | 0 (Reserved) |
| Bit 7 | 0 (Reserved) |

Byte 1: General Bus byte 1 is placed in byte 3 of the status register. The bits in this byte have the following meaning:

| | |
|---|---|
| Bit 0 | External Call Pending |
| Bit 1 | Stopped |
| Bit 2 | Operator Intervening |
| Bit 3 | Check Stop |
| Bit 4 | Not ready |
| Bit 5 | Busy |
| Bit 6 | Function Code |
| Bit 7 | Receiver Check |

Control-Transfer Status Exchange 2:

Byte 0: The ORB Summary byte which indicates malfunctions detected in updating the ORB:

Bits 0–6 = 0 (Reserved)

Bit 7 = ORB contents unreliable (causes a machine check)

Byte 1: General Bus byte 1 is placed in byte 1 of the status register. This byte is reserved and should be a valid zero.

Byte 0 of the status register is reserved for Control Adapter signalled checks. Its bits are used as follows:

| | |
|---|---|
| Bit 0 | Equipment Check |
| Bit 1 | 0 (Reserved) |
| Bit 2 | 0 (Reserved) |
| Bit 3 | 0 (Reserved) |
| Bit 4 | 0 (Reserved) |
| Bit 5 | 0 (Reserved) |
| Bit 6 | 0 (Reserved) |
| Bit 7 | 0 (Reserved) |

If the addressed unit does not send a status byte for byte 1 of the status register, and if the Control Adapter stores any status in the status register, it must zero out byte 1 of that register.

Priority Interruption

When an attached unit's request for a priority interruption matches an enabled priority level, the Control Adapter initiates a control-transfer sequence to accept a priority interruption. It transmits two bytes of control information and accepts up to 6 status bytes in return (see timing diagram FIG. 26).

The control bytes transmitted indicate the level of the interruption being accepted. The status bytes returned indicate the adress of the Operation Request Block associated with the interruption. The Operation Request Block Address is stored in the interruption code extension, a main storage fixed location.

The General Bus bytes are as follows:

Control-Transfer Function Exchange 1:

Byte 0: Hexadecimal 10.

Byte 1: A Function Code indicating the system function requested as follows:

| Hex | |
|---|---|
| 00–OF | Priority Interruption of relative level 0–15 |
| 10–FF | (Reserved) |

Control-Transfer Status Exchange 1:

Byte 0: The ORB summary byte which indicates malfunctions detected in validating the ORB:

Bits 0–6 0 (Reserved)

Bit 7 ORB contents unreliable (causes a machine check)

Byte 1: Reserved. Should be a valid 0.
Control-Transfer Status Exchange 2:
Byte 0: The ORB address, byte 0.
Byte 1: The ORB address, byte 1.
Control-Transfer Status Exchange 3:
Byte 0: The ORB address, byte 2.
Byte 1: The ORB address, byte 3.

I/O Instruction

When an I/O instruction causes a Control Adapter to initiate a control-transfer sequence, it transmits up to 6 bytes of control information and accepts a single status byte in return.

The control bytes are derived from the I/O instruction. The condition code setting is derived from the status byte (see timing diagram, FIG. 27).

The General Bus bytes are as follows:
Control-Transfer Function Exchange 1:
Byte 0: Hexadecimal 11.
Byte 1: A function code indicating the I/O operation as follows:

| Hex | |
|---|---|
| 00 | Invalid (Reserved) |
| 01 | TEST I/O |
| 02 | START I/O |
| 03 | START I/O FAST RELEASE |
| 04 | HALT I/O |
| 05 | HALT DEVICE |
| 06 | TEST CHANNEL |
| 07 | STORE CHANNEL ID |
| 08 | See Control Transfer Sequences |
| 09–FF | Invalid (Reserved) |

Control-Transfer Function Exchange 2:
Byte 0: 0 (Reserved)
Byte 1: The Interface address byte of the I/O address.

Control-Transfer Function Exchange 3:
Byte 0: The channel address byte of the I/O address.

Byte 1: The device address byte of the I/O address.
Control-Transfer Status Exchange 1:
0: The channel status word (CSW) summary byte indicating malfunctions detected in storing the CSW:
Bits 0–6 = 0 (Reserved)
Bit 7 = CSW unreliable (causes a machine check)
Byte 1: The condition code setting:

| Hex | |
|---|---|
| 00 | Condition code 0 |
| 01 | Condition code 1 |
| 02 | Condition code 2 |
| 03 | Condition code 3 |
| 04–FF | Invalid (Reserved) |

I/O Interruption

When an attached unit's request for an I/O interruption matches an enabled channel address, the Control Adapter initiates a control-transfer sequence to accept the I/O interruption. It transmits two bytes of control information and accepts five status bytes in return (See timing diagram, FIG. 28).

The General Bus bytes are as follows:
Control-Transfer Function Exchange 1:
Byte 0: Hexadecimal 11
Byte 1: A Function code indicating I/O interruption acceptance.

| Hex | |
|---|---|
| 08 | I/O Interruption acceptance. Interruption acceptance. |

Control-Transfer Function Exchange 2:
Byte 0: 0 (Reserved)
Byte 1: The channel address for the I/O interruption being accepted.
Control-Transfer Status Exchange 2:
Byte 0: The interface address byte of the I/O address for the interruption code.
Byte 1: The device address byte of the I/O address for the interruption code.
Control-Transfer Status Exchange 3:
Byte 0: The CSW summary byte indicating malfunctions detected in storing the CSW:
Bits 0–6 = 0 (Reserved)
Bit 7 = CSW unreliable (causes a machine check)
Byte 1: Ignored (should be zero).

Reset Sequence

Figure 29:
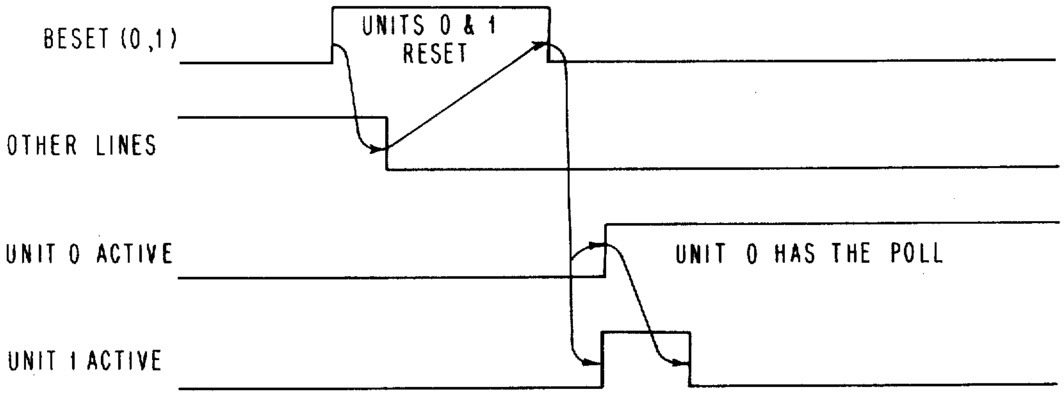
FIG. 29 is a timing diagram of the reset sequence.

The reset sequence is shown in the timing diagram FIG. 29. The reset sequence may be initiated at any time by a control adapter. Whenever the reset line is raised, it causes the immediate termination of any sequence in progress at the control interface and the immediate resetting of all inputs to the interface except for the reset line. The selected unit indicates busy for the duration of the reset procedure.

A control adapter (FIG. 9C) initiates the reset sequence by turning on the reset latch, thus raising the reset line. The reset latch is turned off after a 1 bus delay. This line thus remains up for at least 1 microsecond and any interface sequence in progress is immediately terminated. The attached unit resets all the other lines on the interface except reset within 80 nanoseconds of the rise of the reset line.

Figure 9C:
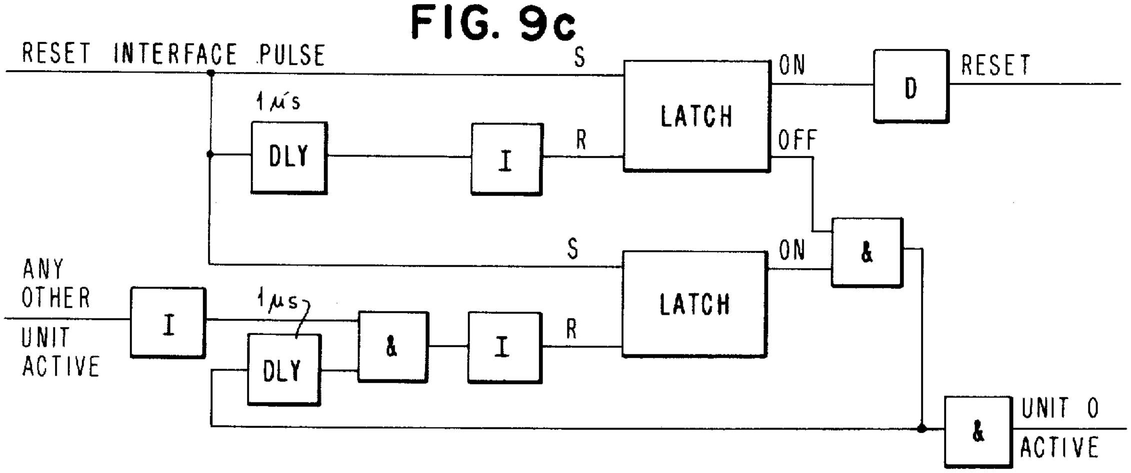
FIG. 9C is a logic diagram for establishing a reset sequence.
Figure 27:
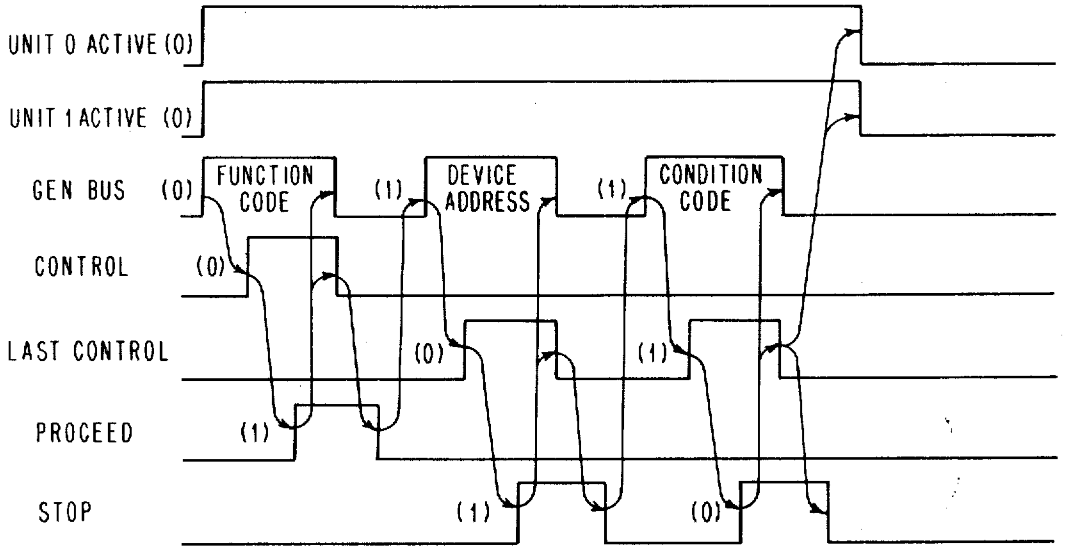
FIG. 27 is a timing diagram of the control transfer sequence for I/O instruction.
Figure 28:
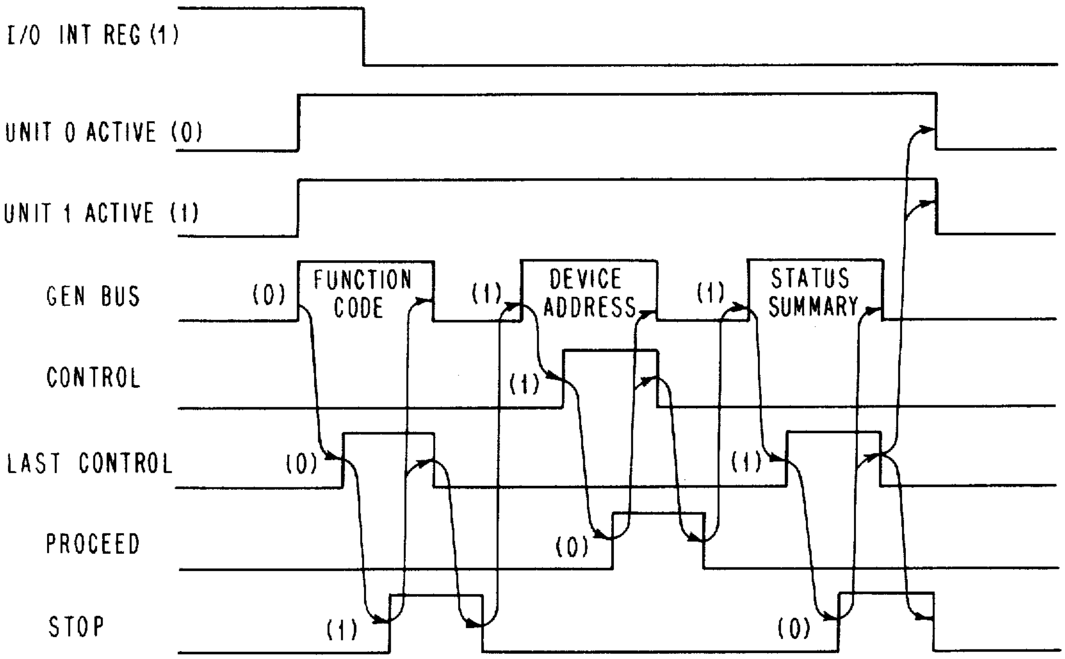
FIG. 28 is a timing diagram of the control transfer sequence for I/O interruption.

At the fall of the reset line, the resetting control adapter (unit 0) raises the unit 0 active line (FIG. 9C). The unit 0 active line must be raised within 80 nanoseconds of the fall of the reset line and remains up for 1 microsecond. The unit 0 active line falls within 1.5 microseconds of its rise with a single exception. Of all these inactive lines raised, the line with the lowest unit number must remain up until all the others fall. In the example of FIG. 27, unit 0 must remain up until unit 1 active falls. The reset sequence is then complete and unit 0 has the poll.

Data Transfer Sequence

When an adapter or master unit is involved in a transfer sequence, it may send information on one or more of the information sources described in Information Sources. The sending unit accommodates skew on the sources by delaying the rise of the signal on a tag line by a time duration which insures that the signals on the information sources precede the signal on the tag line by the amount of skew involved. In the embodiment shown 60 nanoseconds is considered the worst case skew condition. The sending unit must also provide a delay which accommodates the skew caused by its own circuitry.

Data are transferred between main storage and the master adapter by means of data transfer sequences.

The external main storage interface described in External Main Storage Interface allows "pipe lining" of data. That is, it is possible to execute two data transfer sequences, an A sequence and a B sequence, concurrently. An A sequence uses the storage address bus, the data bus, the key bus, the mark bus, the check bus, and the lines in sequencing group A. The lines in sequencing group A are store request A, fetch request A, data transfer response A, data transfer check A, bus response A, and prefix request A.

A B sequence uses the same buses listed above and the lines in sequencing group B. The lines in sequencing group B are store request B, fetch request B, data transfer response B, data transfer check B, bus response B, and prefix request B.

Figure 14:
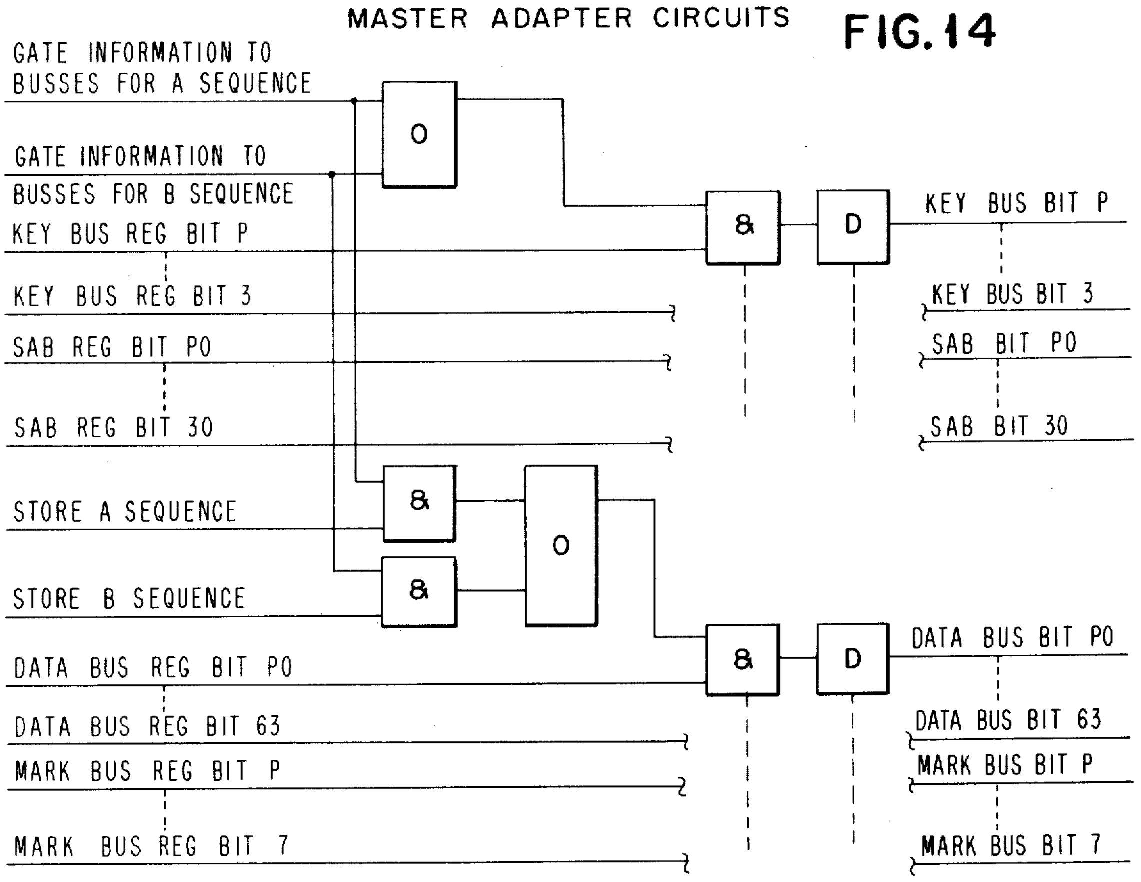
FIG. 14 is logic for the key bus, storage address bus, data bus, and mark bus implementations.
Figure 15:
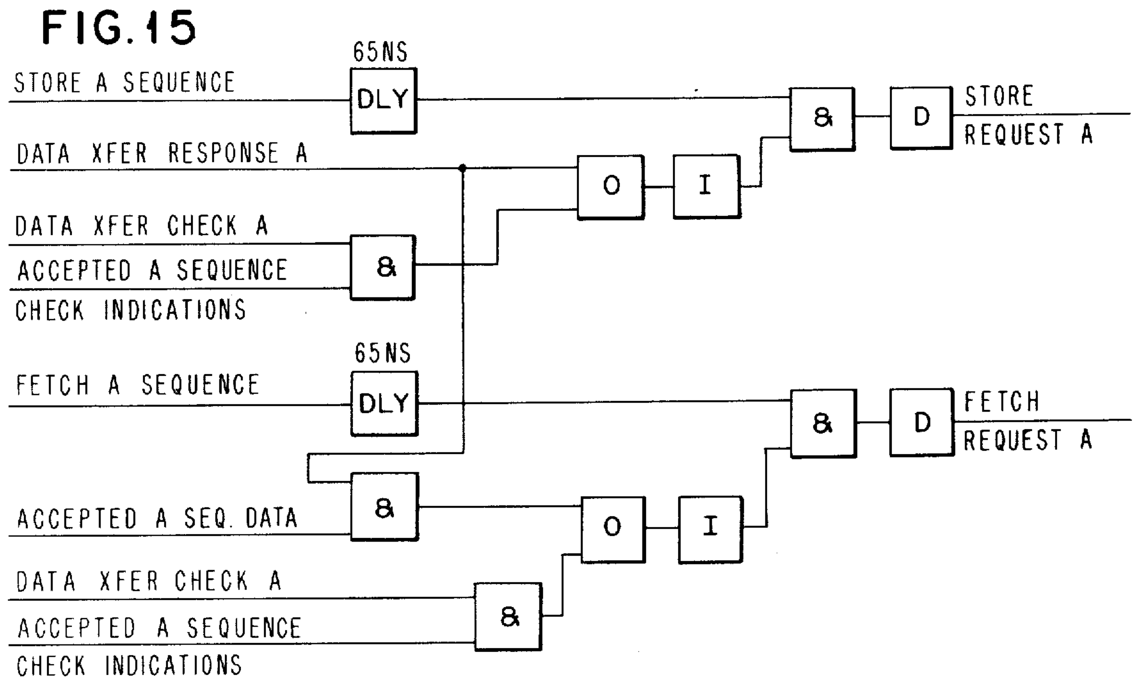
FIG. 15 is logic for the store request and fetch request lines of FIG. 5.

The data transfer sequence will be described with reference to the main storage adapter logic shown in FIGS. 13A – 13D and the master adapter logic, FIGS. 14 and 15 in conjunction with logic flow diagrams shown in FIGS. 22 and 23 for a data transfer sequence.

The master adapter may gate information to the storage address bus (SAB), the key bus, the mark bus, the data bus, and the prefix request A or B in preparation for the initiation of an A or a B sequence upon the condition that the following occur concurrently 1. Bus response A has been raised at the conclusion of any previous A sequence. This insures that the master unit need no longer gate information to the information sources for a preceding A sequence.

2. Bus response B has been raised at the conclusion of a preceding B sequence. This insures that the master unit need no longer gate information to the information sources for a preceding B sequence.

3. If the master unit is to initiate a storage sequence and if the preceding A sequence was a fetch, either data transfer response A or data transfer check A has fallen as the result of that sequence. This insures that the adapter no longer gates information to the data bus for a preceding A sequence.

4. If the master unit is to initiate a storage sequence and the preceding B sequence was a fetch, then either data transfer response B or data transfer check B must already have fallen for that sequence. This insures that the adapter no longer gates information to the data bus with respect to a preceding B sequence.

The following description will describe an A sequence. However, it is understood that the same data flow occurs for a B sequence.

The master unit may initiate an A sequence using sequencing group A whenever both of the following occur concurrently.

1. Any preceding A sequence has been completed.

2. The required information has been gated to the data bus, the mark bus, the key bus, the storage address bus, and prefix request A.

Figure 22:
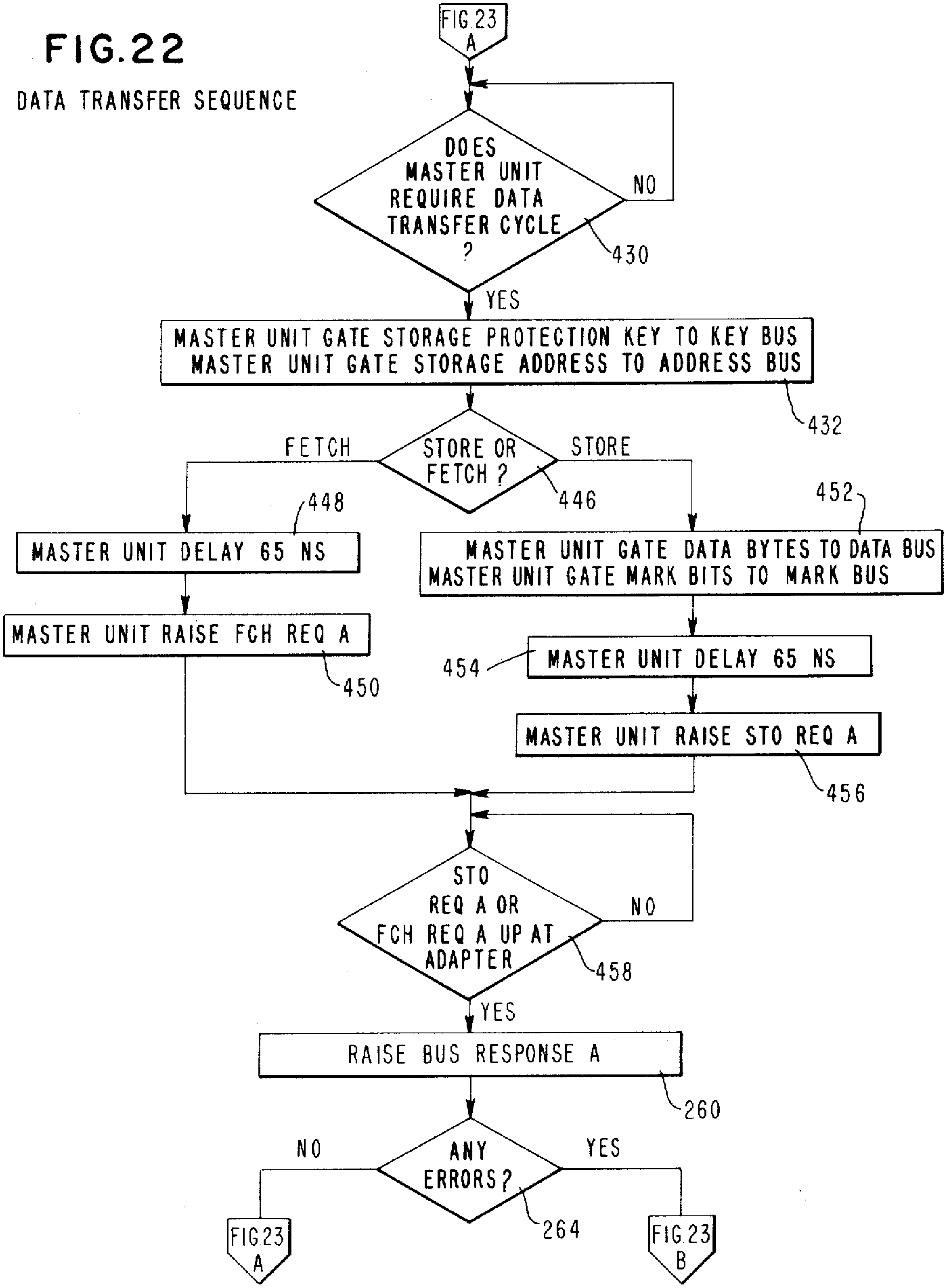
FIGS. 22 and 23 comprise a flowchart of a data transfer sequence.
Figure 23:
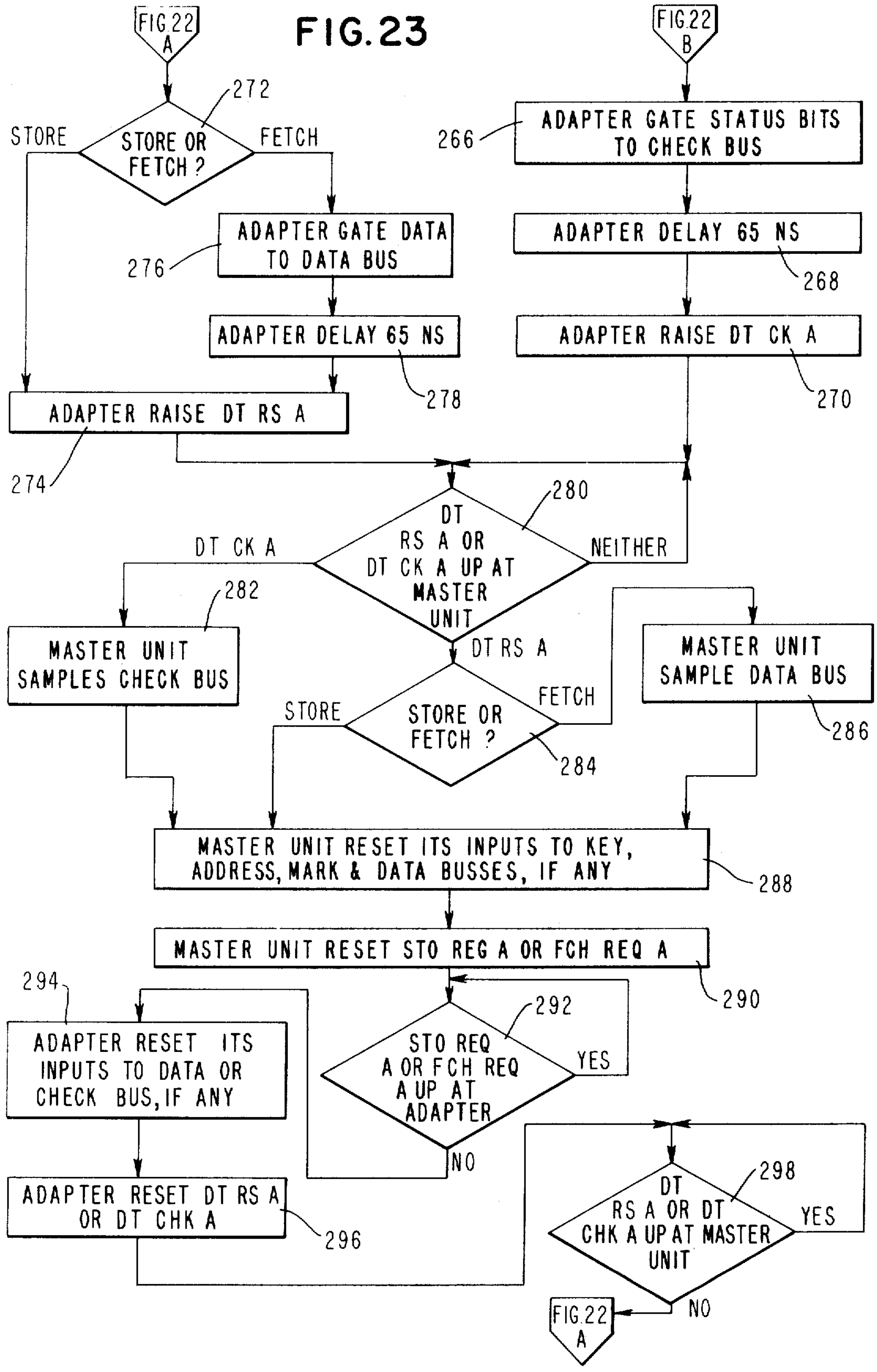

Refer now to FIGS. 22 and 23 which are logic flow diagrams for depicting the logic for energizing the external main storage interface logic shown in FIGS. 13A – 13D, 14 and 15. In FIG. 22, at block 430, if the master adapter unit requires a data transfer cycle the master adapter unit gates the storage protection key for the key bus and gates the storage address to the address bus as illustrated by block 432. At block 446 a decision is made as to whether the sequence is a fetch or a store. If a fetch, after a delay of 65 nanoseconds (block 448) the master adapter unit raises fetch request A (block 450). If, at decision block 446, a store operation is to be performed, the master adapter unit gates data bytes to the data bus and gates mark bits to the mark bus (block 452). After a delay of 65 nanoseconds (block 454) the master adapter unit raises storage request A (block 456).

The master adapter unit has thus initiated an A sequence by raising the proper tag line, either store request A or fetch request A, to signal the presence of information on the data bus, mark bus and/or the storage address bus, the key bus, or prefix request A.

When storage request A or fetch request A are up at the external main storage adapter (block 458) the adapter raises bus response A (block 260) to signal its acceptance of the information. It also initiates the required main storage cycle (block 262). To maintain the proper interlocking, bus response A is not raised any later than the rise of data-transfer (DT) response (RS) A.

The master adapter unit in response to bus response A resets the inputs to the information sources. These inputs are reset before the fall of store request A or fetch request A. The master adapter A starts to prepare for a B sequence by gating new information to the information sources at any time after the rise of bus response A.

At block 264, if errors have been detected, the B path of FIG. 23 is followed and the main storage adapter gates status bits to the check bus (block 266). After a delay of 65 nanoseconds (block 268) the adapter raises data transfer check A (block 270).

Assuming no errors have occurred, the A path of FIG. 23 is followed. If the sequence is a store, the adapter raises data transfer response A (block 274).

If the sequence is a fetch the adapter gates the data to the data bus (block 276) and after a delay of 65 nanoseconds (block 278), the adapter raises data transfer response A (block 274).

Any checks encountered on this data transfer sequence are registered in the status portion of a subchannel associated with the subsystem to which the master adapter is attached. The subchannel storage is used for recording the addresses, counts, status information, and other control information associated with a single operation. The status portion is made available to the system by means of an interruption signalled by the processor instruction or a test I/O instruction.

At block 280 if data check A rises at the master unit, the master adapter unit samples the check bus (block 282) for the checked information.

If data transfer response A rises at the adapter unit, flow continues to block 284. At block 284 if it is a fetch operation, the master adapter unit samples the data bus (block 286). If it is a store operation, there is no need to sample any of the information buses. The flow proceeds to block 288 where the master adapter unit resets its inputs to the key, address, mark and data buses.

If the A sequence involves a store operation, the master adapter drops storage request A. If the A sequence involves a fetch operation, the master adapter signals its acceptance of the data on the data bus by dropping fetch request A (block 290).

At the fall of storage request A or fetch request A (block 292), the adapter resets its inputs to the data or check bus (block 294) and resets data transfer response A or data check A (block 296). When data transfer response A or data check A fall at the master adapter unit (block 298), the A sequence is complete and the logic returns to the A input of FIG. 22.

Bus response A and bus response B are used to allow an early reset and regating of the master adapter unit inputs to the external main storage interface buses. Raising bus response A early in the A sequence allows the master adapter unit to prepare for its succeeding A or B sequence. Consequently an early signal on bus response A potentially increases the data transfer rate for both pipelined and unpipelined operations. The same holds true for a B sequence.

SUMMARY

A communication mechanism for data transfer and control between data processing systems and subsystems has been described. The apparatus is comprised of two separate and functionally independent logic elements which perform control transfer operations and data transfer operations. The first, an external main storage adapter, performs the function of transferring data between a shared storage and a subsystem element over the external main storage interface. The second logical unit is a control adapter which, via a control interface, provides the physical and logical connection between subsystem units and facilitates control transfer operations.

A unit or subsystem may share the main storage of a central processing unit by means of the external main storage adapter. Each adapter is connected to an external main storage interface which provides a point-to-point connection which allows a single external unit to request data transfers. This interface has several information sources or busses and several tag lines. It provides for D.C. interlocked data transfers on a pipelined or non-pipelined basis.

The control interface is connected to control adapters in each subsystem. The subsystems are connected in a multi-dropped manner and have a polling mechanism, a selection mechanism, a general bus and several tag lines. This interface provides for D.C. interlocked control transfer sequences between attached subsystems. It also allows attached subsystems to request priority interruptions and provides an acceptance sequence.

A subsystem element may initiate a control transfer sequence followed by a data transfer sequence only if the unit becomes a master unit to which all other units are a slave. A unit becomes a master unit by means of a polling mechanism more fully described in U.S. Pat. application Ser. No. 319,430 filed Dec. 29, 1972 entitled "Polling Mechanism For Transferring Control From One Data Processing System Or Subsystem To Another" by B. B. Moore.

The signal processor instruction is the fundamental method of communicating with a subsystem. This instruction is described in U.S. Pat. application Ser. No. 268,268, filed July 3, 1972 entitled "Signal Processor Instruction For Non-Blocking Communication Between Data Processing Units" by B. B. Moore, A. Padegs and R. M. Smith.

Execution of the signal processor instruction involves the master unit initiating a control transfer sequence during which a functional request is made of the addressed unit. The functional request is made by means of a function code which is passed to the addressed unit via the control adapter interface. An operation request block is also passed to the addressed unit via the control adapter during the control transfer sequence. The operation request block is more fully described in U.S. Pat. application Ser. No. 268,959, filed July 5, 1972 entitled "Operation Request Block Usage", by B. B. Moore. The operation request block contains parameters associated with and describing a subsequent data transfer operation.

When a signal processor instruction is executed in a subsystem, the function code and operation request block address are passed to the addressed subsystem by means of the control adapter interface. Any data transfers required by the requested operation are accomplished via the external main storage adapter. Status associated with the operation is passed back to the initiating program by means of the operation request block. At priority interruption time, the operation request block address is returned to the program via the control adapter.

Once a subsystem has been loaded with the operation request block parameters and any status information has transferred to the master unit, the subsystem is free to initiate a data transfer sequence. The data transfer sequence is performed over the external main storage interface.

The external main storage interface includes information sources and tag lines. The information sources handle any data to be transferred and the tag lines are energized in predetermined sequences to accomplish the transfer of data.

Once the control interface is free from inter-unit communication, the poll can be requested by another unit which desires to become the master unit. The polling sequence is initiated by the unit which already has the poll when it decides to pass the poll to the requesting unit. The unit having the poll can pass the poll even though a data transfer sequence is in progress since the two interfaces are functionally independent.

While the invention has been particularly shown and described with reference to a preferred embodiment thereof, it will be understood by those skilled in the art that various changes in form and details may be made therein without departing from the spirit and scope of the invention.

What is claimed is:

1. A data processing system comprising:
a plurality of subsystems;
a control transfer interface;
a data transfer interface logically independent of said control transfer interface;
means for connecting said subsystems to said control interface in a multi-dropped closed loop;
means for connecting said subsystems to said data transfer interface point-to-point;
a polling mechanism in each subsystem and associated with said control transfer interface for allocating temporary control of said control interface to a subsystem desiring to initiate data transfer over said data transfer interface.

2. A data processing system comprising:
a plurality of subsystems;
a control transfer interface;
a data transfer interface;
means for connecting said subsystems to said control interface in a multi-dropped closed loop;
means for connecting said subsystems to said data transfer interface point-to-point;
a polling mechanism in each subsystem and associated with said control transfer interface for allocating temporary control of said control interface to a predetermined subsystem desiring to initiate data transfer over said data transfer interface, and means in said predetermined subsystem for sequencing said control transfer interface to effect transfer of program specifiable control initiating order code information and associated return transfer of either acceptance or specific plural bit exception status indications to said predetermined subsystem.

3. Apparatus for establishing and maintaining communication between a number of different types of subsystems in a data processing system comprising:

a control interface including information sources and tag control lines interconnecting said subsystems in a multi-dropped closed loop;

polling means associated with each subsystem interacting with said tag control lines of said control interface for relegating to a particular subsystem the logical state of the master subsystem, in a master/-slave relationship with others of said subsystems;

selection means in said particular subsystem associated with said control interface tag control lines for initiating a control transfer sequence over said control interface, to thereby prepare one of said slave subsystems to send or receive data to or from said master subsystem;

an external main storage interface interconnecting said subsystems point-to-point; and means in said particular subsystem for initiating a data transfer sequence over said external main storage interface.

4. Apparatus for establishing and maintaining communication between a number of different types of subsystems in a data processing system comprising:

a control interface including information sources and tag control lines interconnecting said subsystems in a multi-dropped closed loop;

selection means in a particular subsystem associated with said control interface for initiating a control transfer sequence to transfer control information over said information sources of said control interface, to thereby select and prepare one of said subsystems to send or receive data to or from said particular subsystem;

an external main storage interface interconnecting said subsystems point-to-point;

means for initiating a data transfer sequence over said external main storage interface; and a polling mechanism associated with said tag control lines for allocating temporary control of said control interface to said particular subsystem, whereby said particular subsystem may initiate communication with said one of said subsystems.

* * * * *